US008616234B2

(12) United States Patent
Ringer et al.

(10) Patent No.: US 8,616,234 B2
(45) Date of Patent: Dec. 31, 2013

(54) FLUID CONTROL VALVE SYSTEM AND METHODS

(75) Inventors: Yoram Ringer, Providence, RI (US); Roger S. Wilkins, Warwick, RI (US); Boris Frenkel, Netanya (IL)

(73) Assignee: Tyco Fire Products LP, Lansdale, PA (US)

( * ) Notice: Subject to any disclaimer, the term of this patent is extended or adjusted under 35 U.S.C. 154(b) by 826 days.

(21) Appl. No.: 12/444,370

(22) PCT Filed: Oct. 19, 2007

(86) PCT No.: PCT/US2007/082006
§ 371 (c)(1),
(2), (4) Date: Dec. 3, 2009

(87) PCT Pub. No.: WO2008/051871
PCT Pub. Date: May 2, 2008

(65) Prior Publication Data
US 2010/0071776 A1      Mar. 25, 2010

Related U.S. Application Data

(60) Provisional application No. 60/862,305, filed on Oct. 20, 2006, provisional application No. 60/887,040, filed on Jan. 29, 2007.

(51) Int. Cl.
*F16K 31/36*          (2006.01)
(52) U.S. Cl.
USPC ...................................... 137/489.5; 251/61.1
(58) Field of Classification Search
USPC ......... 251/61.1, 331, 61; 137/488, 489, 489.5
See application file for complete search history.

(56) References Cited

U.S. PATENT DOCUMENTS 3,802,462 A    4/1974  Trosch
4,901,751 A    2/1990  Story et al.
(Continued)

FOREIGN PATENT DOCUMENTS

GB       2040407       8/1980
GB       2231126       11/1990

OTHER PUBLICATIONS

International Search Report and Written Opinion for PCT/US07/82006 (13 pages), Aug. 6, 2008.

(Continued)

*Primary Examiner* — John Bastianelli
*Assistant Examiner* — Andrew J Rost
(74) *Attorney, Agent, or Firm* — Perkins Coie LLP

(57) ABSTRACT

A diaphragm-type control valve having a diaphragm and a valve body is provided preferably for use in the separation of and fluid control between a fluid source and a pressurized gas volume. The diaphragm element and a port in the body together form an intermediate chamber that eliminates the need for a check-valve downstream of the valve. In one preferred embodiment, an inner surface of the valve body defines a chamber having an inlet and an outlet in communication with the chamber, and an elongated seat member defining a groove in communication with the port. A diaphragm member having upper and lower surfaces is disposed within the chamber. The lower surface preferably includes a pair of spaced apart elongated members defining a channel therebetween. The diaphragm member engages the seat member placing the channel in communication with the groove to define an air seat in communication with the port.

53 Claims, 12 Drawing Sheets

(56) References Cited

U.S. PATENT DOCUMENTS

| | | |
|---|---|---|
| 5,464,064 A | 11/1995 | Weingarten |
| 5,476,118 A | 12/1995 | Yokoyama |
| 5,706,859 A | 1/1998 | Backlund |
| 6,209,654 B1 * | 4/2001 | Curless .......................... 169/17 |
| 6,848,513 B2 * | 2/2005 | Jackson et al. .................. 169/19 |
| 2005/0205815 A1 * | 9/2005 | Frenkel ........................ 251/61.1 |

OTHER PUBLICATIONS

Apr. 22, 2009 Intl Preliminary Report on Patentability issued in Intl Application No. PCT/US07/082006, including the Aug. 6, 2008 Written Opinion of the ISA.

* cited by examiner

FLUID CONTROL VALVE SYSTEM AND METHODS

PRIORITY DATA AND INCORPORATION BY REFERENCE

This application is a 35 U.S.C. 371 application of International Application No. PCT/US 2007/082006, filed Oct. 19, 2007, which claims the benefit of priority to U.S. Provisional Patent Application No. 60/862,305, filed Oct. 20, 2006 and to U.S. Provisional Patent Application No. 60/887,040, filed Jan. 29, 2007, each of which is incorporated by reference in their entirety.

BACKGROUND OF THE INVENTION

Diaphragm-type fluid control valves can provide controlled fluid separation and flow along a pipe-line, manifold or other piping network. Generally, the diaphragm-type valve includes a flexible diaphragm element to control fluid flow between the inlet and the outlet of the valve body. More specifically, in known diaphragm-type valves, the diaphragm element engages a seat formed within the valve body to separate the interior chamber of the valve body into three parts: (i) the inlet chamber which can hold the supply fluid, (ii) an outlet chamber which receives fluid from the inlet chamber for discharge out the outlet and (iii) a diaphragm chamber which can hold a fluid under pressure to urge and maintain the diaphragm element in the seated position. Upon release of fluid pressure from the diaphragm chamber, the diaphragm element can be displaced from the seated position by the pressure of fluid in the inlet chamber and fluid flow is permitted between the inlet and the outlet chambers. Known diaphragm elements and diaphragm-type control valves are shown and described in European Patent Application No. EP 0928917, U.S. Pat. No. 6,095,484 and U.S. Pat. No. 7,059,578, each of which is incorporated herein by reference in its entirety. Another known diaphragm-type valve is shown and described in Tyco Fire & Building Products data sheet TFP1305 entitled, "Model DV-5 Deluge Valve, Diaphragm Style, 1½ thru 8 Inch (DN40 thru DN200), 250 psi. (17.2 bar) Vertical or Horizontal Installation" (March 2004) as described in U.S. Provisional Patent Application No. 60/887,040.

One particular application for using known diaphragm-control valves is in the control of fluid flow between a fluid source under pressure such as, for example, a water main, and another fluid volume such as, for example, a network of pipes filled with a air. When a diaphragm-type valve is used to separate two fluid volumes that are to be independently pressurized, a check-valve is typically employed downstream of the diaphragm valve to form a seat against which the air or other fluid pressure may build downstream of the valve. For example, dry preaction fire protection systems employ a riser check-valve downstream of the diaphragm control valve to provide a seat for pressurizing the downstream network of pipes and sprinklers with pressurized gas. Such preaction system installations are shown for example in the following Tyco Fire & Building Product data sheets, each of which is incorporated by reference in their entirety and described in U.S. Provisional Patent Application No. 60/887,040 respectively: (i) TFP1420 "Preaction System with Model DV-5 Deluge Valve Single Interlock, Supervised—Electronic Actuation 1½ thru 8 Inch (DN40 thru DN200)" (September 2004) showing a riser check valve 16 in FIG. 1; (ii) TFP1415 "Preaction System with Model DV-5 Deluge Valve Single Interlock, Supervised—Dry Pilot Actuation 1½ thru 8 Inch (DN40 thru DN200)" (September 2004) showing a riser check valve 17 in FIG. 1; (iii) TFP1410 "Preaction System with Model DV-5 Deluge Valve Single Interlock, Supervised—Wet Pilot Actuation 1½ thru 8 Inch (DN40 thru DN200)" (September 2004) showing a riser check valve 14 in FIG. 1; (iv) TFP1465 "Preaction System with Model DV-5 Deluge Valve Double Interlock—Electronic/Electric Actuation 1½ thru 8 Inch (DN40 thru DN200)" (September 2004) showing a riser check valve 16 in FIG. 1; and (v) TFP1460 "Preaction System with Model DV-5 Deluge Valve Double Interlock—Electronic/Pneumatic Actuation 1½ thru 8 Inch (DN40 thru DN200)" (September 2004) showing a riser check valve 16 in FIG. 1. Effectively, the check valve defines for the system two pressures between the control valve and the network of sprinklers: (i) a first pressure down stream of the check valve equivalent to the supervisory air of the system; and (ii) a second pressure upstream of the valve between the control valve and the check valve that is different than the first pressure. The second pressure is typically atmospheric pressure to provide for a drain and/or an alarm port to comply with the installation or operational requirements under one or more standards such as, for example, Factory Mutual (FM) LLC publication, "Approval Standard: For Automatic Water Control Valves—Class Number 1020" (April 2007) ("FM Standard 1020").

SUMMARY OF THE INVENTION

In one preferred embodiment according to the present invention, a fluid control valve is provided with an internal diaphragm member that axially separates two chambers from one another with an intermediate chamber in between. In one aspect, the preferred control valve can be installed in piping systems, such as for example, the preaction fire protection systems described above without the need for a check valve downstream of the control valve. Instead, the intermediate chamber of the preferred control valve can provide for the drain and/or alarm port at atmospheric pressure. Thus, the preferred control valve can provide for a single and preferably substantially constant pressure between the control valve and the network of sprinklers. Preferably adjacent each of the two axially separated chambers is a diaphragm chamber for controlled operation of the diaphragm member. The preferred orientation of the diaphragm chamber relative to the axially spaced chambers provides that the diaphragm chamber can seal the axially spaced chambers from one another with a diaphragm fluid pressure that is almost at a preferred 1:1 ratio and more preferably at a 1:1.2 ratio, with the fluid pressure in either one of the two axially separated chambers. Moreover, the preferred control valve, the diaphragm, and orientation of the chambers provide for a controlled seal between the axially spaced chambers that can compensate for fluctuations and surges in the fluid pressure in either of one of the two axially separated chambers.

In another preferred embodiment, a diaphragm-type control valve is provided for use in the separation and flow control between a first fluid volume at a first fluid pressure and a second fluid volume at a second fluid pressure. The preferred diaphragm-type control valve provides a chamber having a first sealed engagement for sealing the first fluid volume and a second sealed engagement for sealing the second fluid volume. The first sealed engagement is preferably spaced from the second sealed engagement so as to define an intermediate chamber therebetween. More preferably, the intermediate chamber is exposed to atmosphere so as to define an alarm port for detecting a breach in either the first or second sealed engagement. Accordingly, one preferred embodiment of a fluid control valve includes a valve body having a first inner surface defining a chamber having a first axis and a second axis substantially perpendicular to the first axis. The chamber further includes an inlet and an outlet in communication with the chamber and substantially aligned along the first axis. The inner surface also preferably includes an elongated seat member substantially aligned along the second axis and preferably defining a groove. A portion of the body further preferably defines a port in communication with the groove. The preferred control valve also includes a diaphragm member disposed within the chamber for controlling communication between the inlet and the outlet. The diaphragm member has an upper surface and a lower surface. The lower surface preferably includes a pair of spaced apart elongated members defining a channel therebetween. The diaphragm member preferably has a first position permitting communication between the inlet and the outlet and at least a second position wherein the elongated members are in sealed engagement with the seat member such that the channel is in communication with the groove and the port.

In one preferred embodiment of the diaphragm member, the diaphragm member defines a central axis substantially perpendicular to the first and second axis. Furthermore each of the elongated members includes an angled surface extending from the lower surface of the diaphragm member to define a surface of the channel and terminating in a peak. Accordingly, the elongated members preferably define a substantially triangular cross area.

In a preferred embodiment of the valve body, the seat member defines a substantially planar surface extending along an arc length in its direction of elongation. Moreover, the valve body further includes a first brace member and a second brace member disposed about and engaged with the seat member. Preferably the first and second brace members are integrally formed with the seat member.

In another preferred embodiment of the valve body, the valve body defines a central axis substantially perpendicular to the first and second axes, and the port is preferably substantially aligned with the central axis. The port further preferably has a first portion having a first width opening and a second portion axially aligned with the first portion, the second portion having a second width opening having a width smaller than the first width opening. More preferably, the first portion and the second portion are substantially cylindrical each having a central axis, the central axis of the first portion being spaced from the central axis of the second portion. In addition, the second width is defined along the first axis and the second portion defines a third width along the second axis greater than the second width. Furthermore, the port preferably defines a substantially elongated oval cross-section.

In another preferred embodiment, provided is a valve including a body having an inlet, an outlet and inner surface defining a passageway between the inlet and the outlet. The body further includes an atmospheric port in communication with the passageway and located between the inlet and the outlet. Moreover, the valve includes a flexible member engaged with the inner surface to dissect the passageway to define an inlet chamber in communication with the inlet, an outlet chamber in communication with the outlet and an intermediate chamber in communication with the port. Preferably, the port includes a first portion defining a first width and a second portion axially aligned with the first portion and defining a second width, wherein further the first width is greater than the second width.

Another preferred embodiment provides a method of pressurizing a fluid inlet and a fluid outlet chamber in a fluid control valve having a diaphragm member between the inlet and outlet chambers. The method preferably includes sealing the diaphragm to form the first fluid chamber axially spaced from the second fluid supply chamber, and exposing a portion of the diaphragm between the inlet and outlet chambers to atmospheric air pressure to form an air seat.

Another preferred embodiment provides a system for fire protection having a primary fluid, a secondary fluid, a closed piping network of sprinklers, and a fluid control valve. The control valve includes a body having an inlet coupled to the primary fluid, an outlet coupled to the network of pipes and an inner surface defining a passageway between the inlet and the outlet and a flexible member engaged with the inner surface. The flexible member dissects the passageway to define an inlet chamber in communication with the inlet for housing the primary fluid at a first pressure, and an outlet chamber in communication with the network of pipes so as to form a normally closed system to house the secondary fluid at a second pressure. The second pressure is preferably substantially constant between the outlet chamber and the network of pipes and greater than atmospheric pressure.

Accordingly, the various preferred embodiments of the preferably hydraulically operated control valve, its diaphragm and method of use can provide one or more of the following features: a design that employs a minimum number of moving components to reduce wear, a construction that facilitates easy assembly and serviceability, and reliable performance. In addition, the preferred embodiments provide for piping systems, and more specifically fire protections systems, such as for example, preaction and non-preaction (deluge systems). In the case of preaction systems, the preferred control valve can minimize the number of components required for a complete system that is preferably compliant with applicable installation and operational standards and requirements by consolidating in a single valve the functions of: (i) controlled sealing between the "wet" region of the system and the "dry" region of the system; and (ii) providing a monitoring region, preferably exposed to atmosphere, between the "wet" and "dry" regions which can provide visual and/or audio indication of valve and/or system operation.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 1 is a perspective view of a preferred control valve,
FIG. 2 is an exploded view of the control valve of FIG. 1.
FIG. 2A is a cross-sectional view of the control valve of FIG. 1.
FIG. 2B is a plan view of the control valve of FIG. 1.
FIG. 2C is a detailed view of a preferred threaded stud assembly for use in the control valve of FIG. 1.
FIG. 3A is a plan-view of the upper surface of a preferred diaphragm for use in the control valve of FIG. 1.
FIG. 3B is a plan-view of the lower surface of the diaphragm in FIG. 3.
FIG. 3C is a cross-sectional view of the diaphragm along axis IIIC-IIIC in FIG. 3B.
FIG. 3D is another cross-section view of the diaphragm along axis IIIC-IIIC in FIG. 3B.
FIG. 4A is a plan-view of the lower valve body of the control valve in FIG. 1.

DETAILED DESCRIPTION

Figure 1:
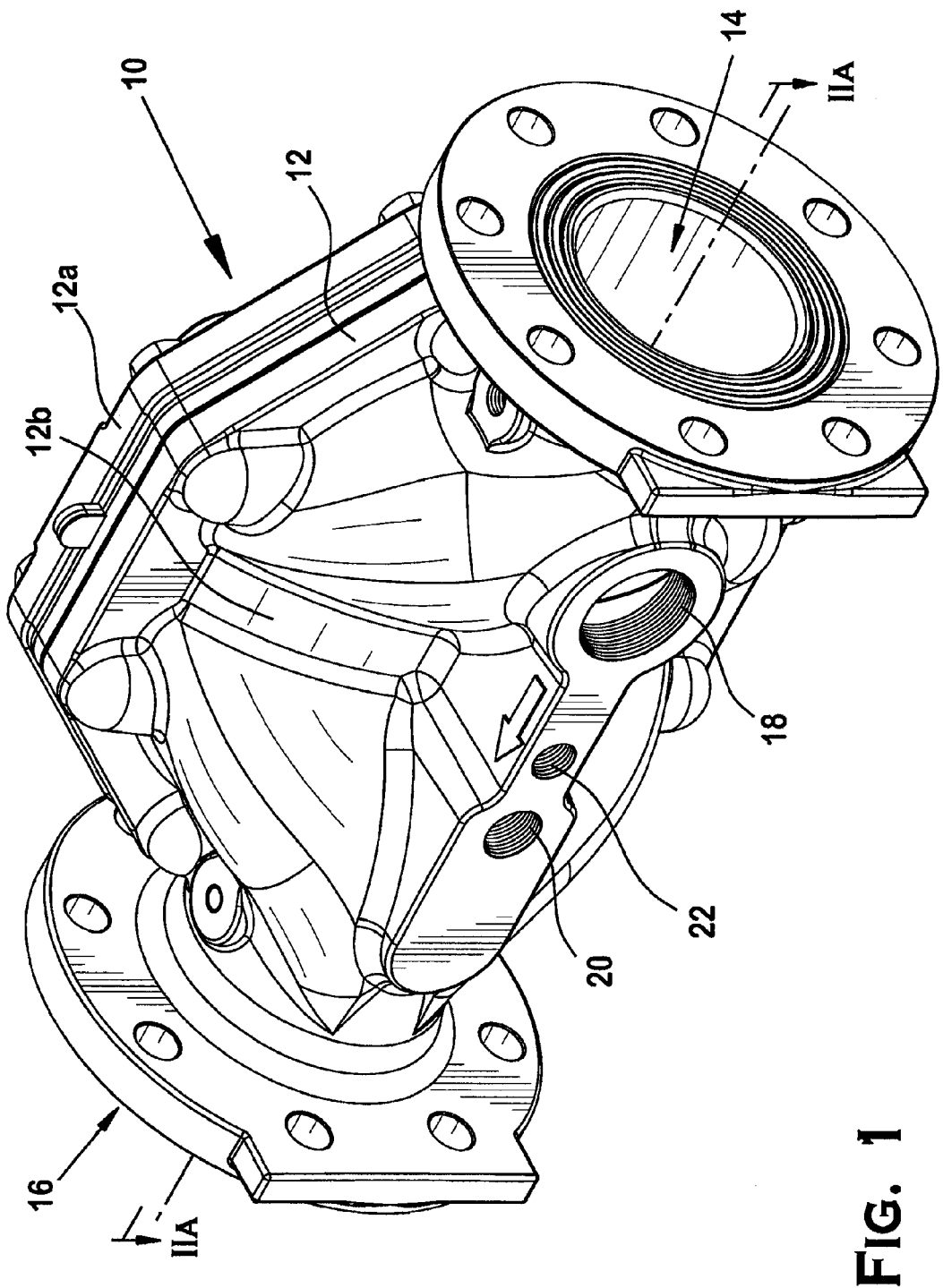

Shown in FIG. 1 is an illustrative embodiment of a preferred control valve 10. The valve 10 includes a valve body 12 through which fluid can flow in a controlled manner. More specifically, the control valve 10 provides a diaphragm-type hydraulic control valve for preferably controlling the release and mixture of a first fluid volume having a first fluid pressure, such as for example a water main, with a second fluid volume at a second fluid pressure, such as for example, compressed gas contained in a network of pipes. Accordingly, the control valve 10 can provide fluid control between fluids or various media including liquids, gasses or combinations thereof.

The control valve 10 is preferably configured for installation in a piping manifold or other piping assembly to separate and control fluid flow between the first fluid volume and the second fluid volume. The control valve 10 includes a valve body 12 preferably constructed in two parts: (i) a cover portion 12a and (ii) a lower body portion 12b. "Lower body" is used herein as a matter of reference to a portion of the valve body 12 coupled to the cover portion 12a when the control valve is fully assembled. Preferably, the valve body 12 and more specifically, the lower body portion 12b includes an inlet 14 and outlet 16. Each of the inlet and outlet 14, 16 of the body 12 includes an appropriate end fitting for coupling to the manifold. Thus, inlet 14 preferably includes a flanged end for coupling to a first fluid supply line, such as for example a water main, and the outlet 16 also preferably includes a flanged end for coupling to another pipe fitting such as, for example, a discharge pipe coupled to a network of interconnected pipes. The control valve 10 can be installed in either a horizontal orientation such that fluid entering the inlet 14 at one elevation is discharged from the outlet 16 at the same elevation, or alternatively, the control valve can be installed in a vertical orientation such that fluid entering the inlet at one elevation is discharged from the outlet at a different elevation.

The inlet 14, outlet 16 and valve body 12 can be sized so as to provide a range of nominal valve sizes for coupling to corresponding pipe size. Preferably, the inlet 14, outlet 16 and valve body 12 define nominal valve sizes of 1 inch and larger and more specifically nominal valve sizes of 1½ inch, 2 inch, 3 inch, 4 inch, 6 inch and 8 inch, however other nominal valve sizes can be provided. Preferably, construction of the valve 12, the cover 12a and the lower valve body 12b are separately cast and machined to provide the preferred openings and surface treatments such as threaded openings. However, other processes for construction and manufacturing can be used. The valve body 12 is preferably cast from ductile iron however other materials may be used provided they are suitable for a given fluid flow application.

The valve body 12 also includes a drain 18 for diverting the first fluid entering the valve 10 through the inlet 14 to outside the valve body. The valve body 12 further preferably includes an input opening 20 for introducing the second fluid into the body 12 for discharge out the outlet 16. An exemplary cover 12a, and lower body 12b with an inlet 14, an outlet 16, a fluid drain 18 and an input opening 20, is shown and described in U.S. Pat. Nos. 6,095,484 and 7,059,578. However, unlike the valves shown and described in U.S. Pat. Nos. 6,095,484 and 7,059,578, the preferred diaphragm-type control valve 10 further includes a valve body 12 with a port 22. The inventors have discovered that the inclusion of a port 22 in the valve body 12 can provide means for an alarm system monitoring the valve for any undesired fluid communication from and/or between the inlet 14 and the outlet 16. For example, the port 22 can be used for providing an alarm port to the valve 10 so that individuals can be alerted as to any gas or liquid leak from the valve body 12. More specifically, the port 22 can be coupled to a flow meter and alarm arrangement to detect the fluid or gas leak in the valve body. In addition, the port 22 is preferably open to atmosphere and in communication with an intermediate chamber disposed between the inlet 14 and the outlet 16. Each of the fluid drain 18, input opening 20 and port 22 can include an appropriately threaded opening or other mechanical fastening member for coupling an appropriate pipe fitting or nipple to the given orifice.

Figure 2:
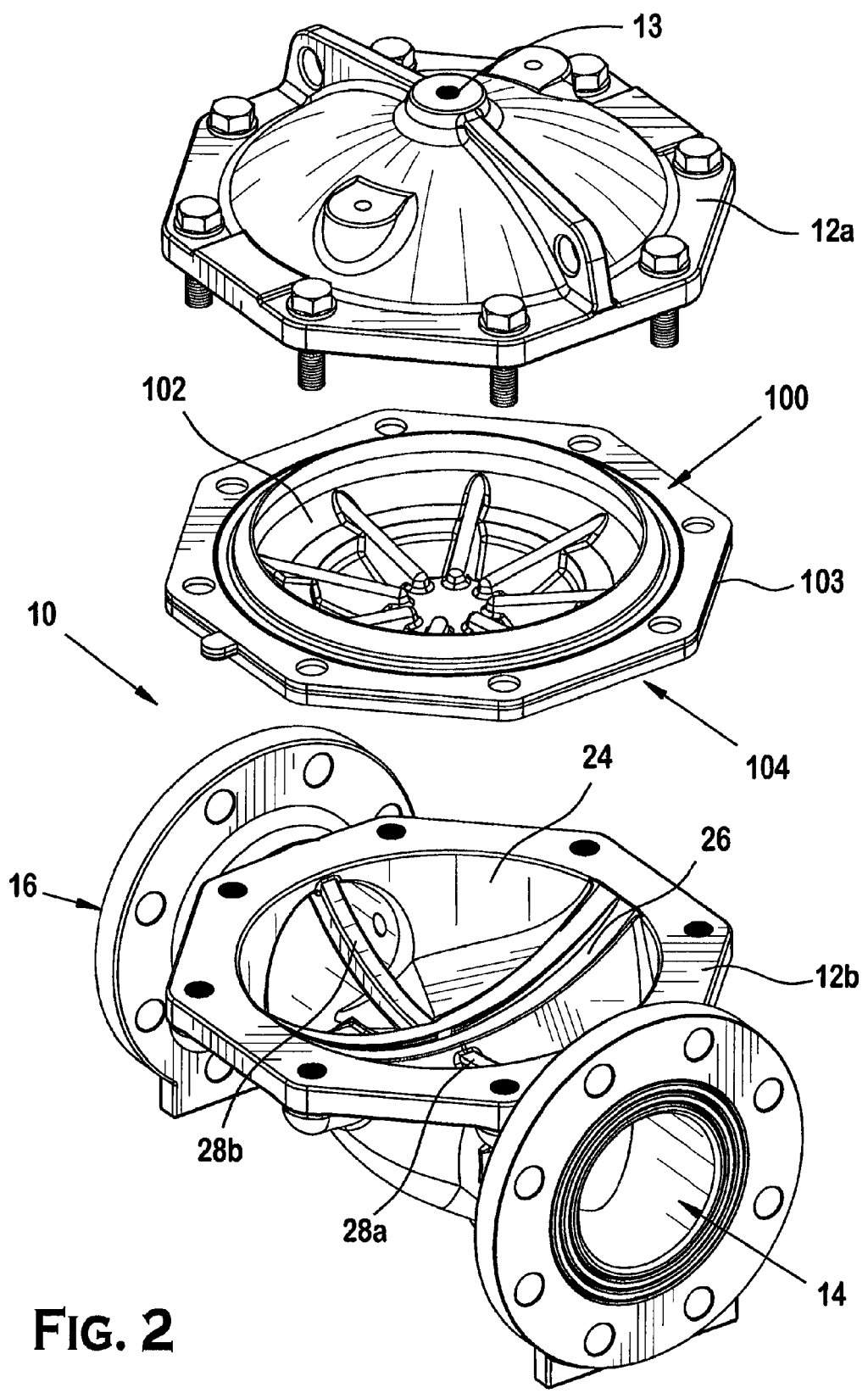

Shown in FIG. 2 is an exploded view of the preferred valve 10 showing the internal components of the valve 10. The cover 12a and the lower body portion 12b are preferably coupled together by a plurality of bolts distributed in a bolt pattern about the body 12. Shown in FIG. 2B is a plan view of the control valve 10 and a preferred bolt pattern that includes eight nut and bolt assemblies. In an alternative bolt assembly, shown for example in FIG. 2C, a threaded stud nut and assembly 50 can be utilized. The stud assembly 50 preferably includes a threaded stud 52 engaged with the corner bolt holes of the cover 12a and the lower valve body 12b. To secure the cover 12a to the assembly, the washer and nut can be threaded onto and tightened about the stud 52. The stud assembly 50 can facilitate the assembly of the control valve 10 when installed in the vertical orientation. More specifically, preferably four threaded studs 52 can be equally spaced about the bolt pattern engaged with the lower valve body 12b. The studs can be permanently or temporarily fixed to the lower valve body 12b. The cover 12a can then be disposed over the threaded studs 52 and permitted to hang supported by the threaded studs 52 thereby freeing an assembler's hands to complete the control valve assembly with the necessary threaded bolt and nut assemblies. Preferably, each of the threaded studs 52 are preferably rated to support a transverse load of between fifty to one hundred pounds (50-100 lbs.). To further facilitate assembly of the control valve 10, the cover 12a can include one or more eyelets to which a hook and cable or chain may be secured for lifting the cover 12a into position adjacent the lower valve body 12b.

The cover 12a and the lower body 12b each include an inner surface such that when the cover and lower body portion 12a, 12b are joined together, the inner surfaces further define a chamber 24. The chamber 24, being in communication with the inlet 14 and the outlet 16, further defines a passageway through which a fluid, such as water, can flow. Disposed within the chamber 24 is a flexible preferably elastomeric member 100 for controlling the flow of fluid through the valve body 12. The elastomeric member 100 is more preferably a diaphragm member configured for providing selective communication between the inlet 14 and the outlet 16. Accordingly, the diaphragm has at least two positions within the chamber 24: a lower most fully closed or sealing position and an upper most or fully open position.

Figure 2A:
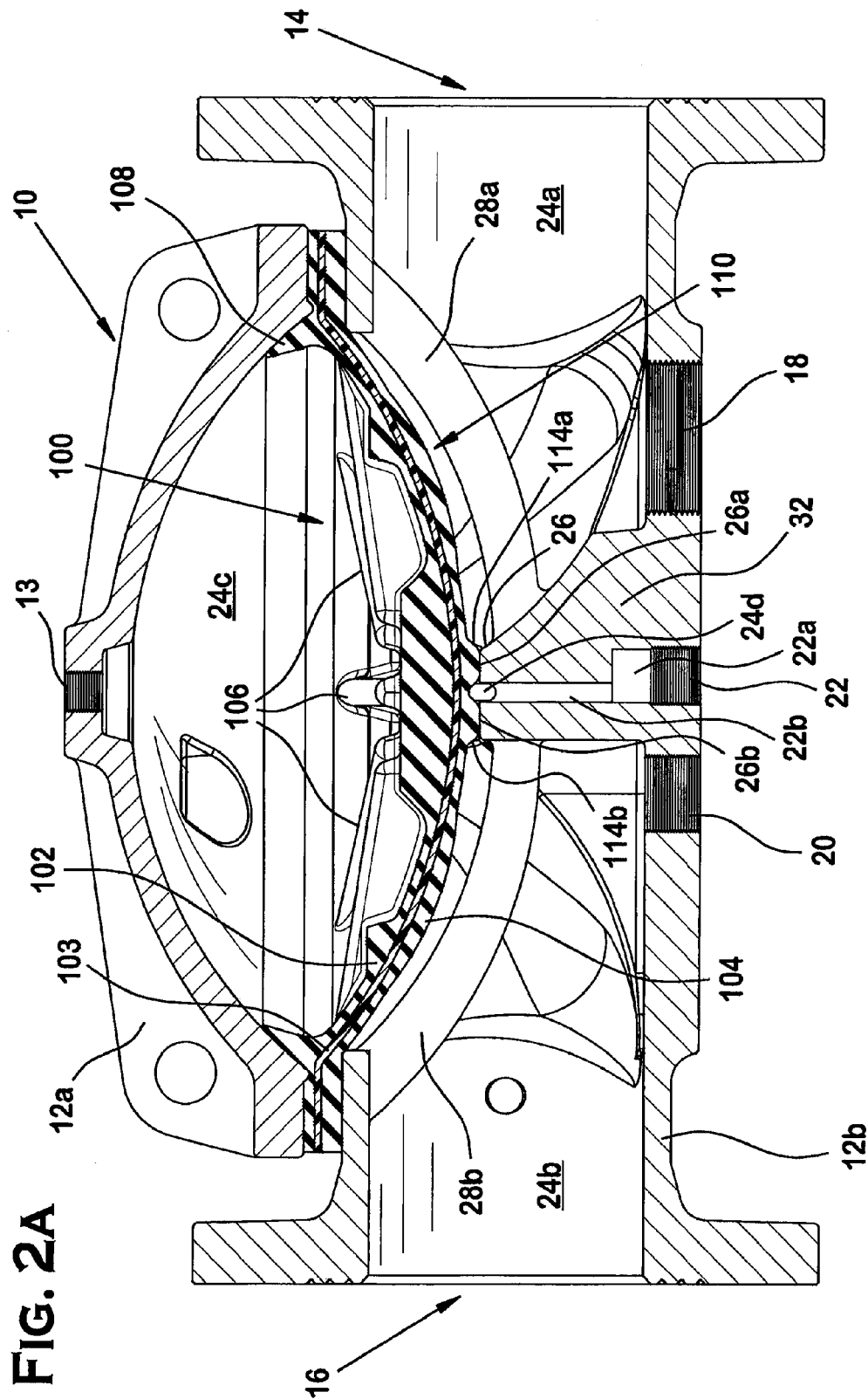
Figure 2B:
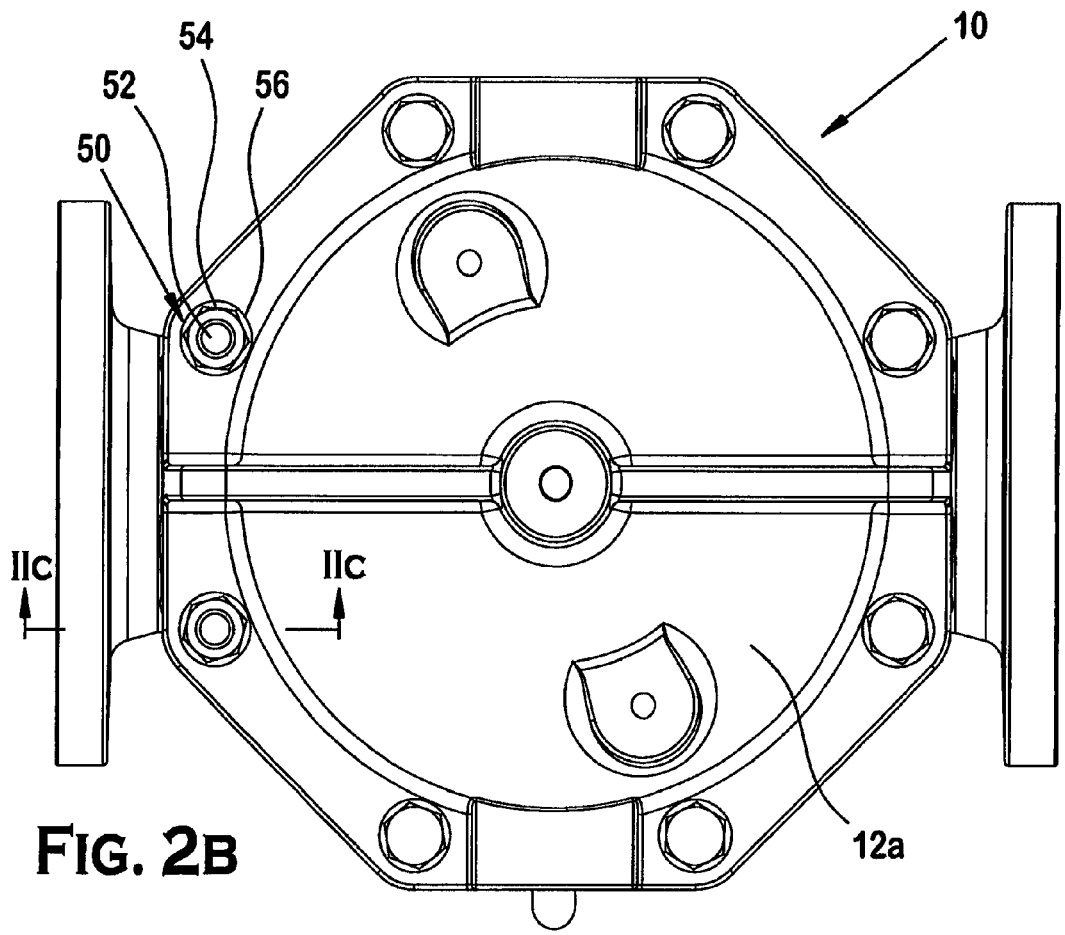
Figure 2C:
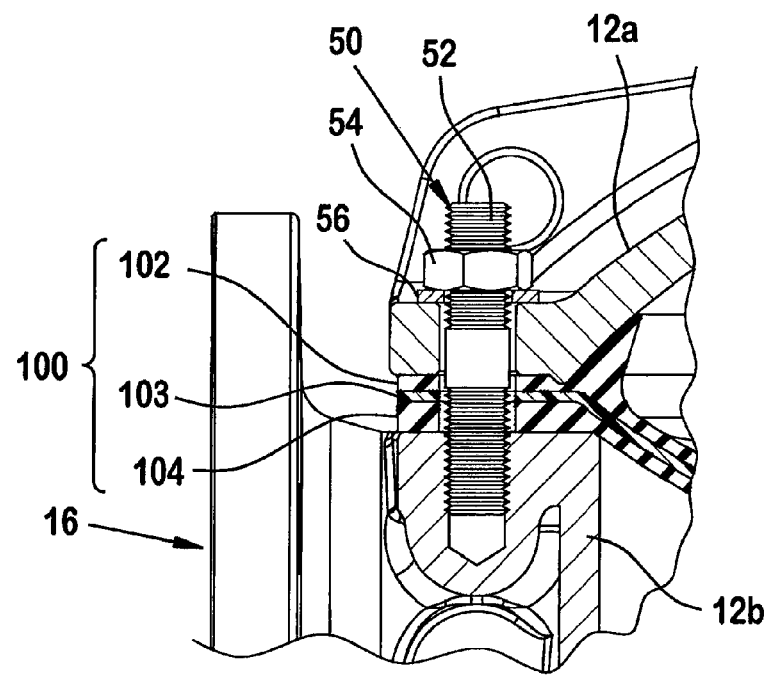

In the lower most closed or sealing position, as seen for example in FIG. 2A, the diaphragm 100 engages a seat member 26 constructed or formed as an internal rib or middle flange within the inner surface of the valve body 12 thereby sealing off communication between the inlet 14 and the outlet 16. With the diaphragm 100 in the closed position, the diaphragm 100 preferably dissects the chamber 24 into at least three regions or sub-chambers 24a, 24b and 24c. More specifically formed with the diaphragm member 100 in the closed position is a first fluid supply or inlet chamber 24a in communication with the inlet 14, a second fluid supply or outlet chamber 24b in communication with the outlet 16 and a diaphragm chamber 24c. The cover 12a preferably includes a central opening 13 for introducing an equalizing fluid into the diaphragm chamber 24c to urge and hold the diaphragm member 100 in the closed position. Preferably, the equalizing fluid is provided from the first fluid source such that any surges in flow or pressure experienced at the inlet chamber 24a is also experienced in the diaphragm chamber 24c such that diaphragm chamber can react and compensate with a diaphragm pressure to maintain the diaphragm member 100 in the closed position.

Moreover, the preferred relative orientation of the sub-chambers 24a, 24b, 24c is such that the each of the inlet and outlet chambers 24a, 24b are adjacent the diaphragm chamber 24c which, in combination with the flexibility of the diaphragm member 100, contributes to the ability of the diaphragm chamber 24c to compensate for surges in the flow or pressure experienced in either the inlet or outlet chambers 24a, 24b. In addition, the preferred orientation can further facilitate the performance of the valve 10 to maintain the sealed engagement of the diaphragm member 100 under the preferred ratio of equalizing fluid pressure to primary fluid pressure in a manner described in greater detail below. Known fluid control valves that use either a more rigid type of diaphragm or mechanical latching clapper are believed to require an increased mechanical force or equalizing pressure to maintain a seal within the valve in order to compensate for any possible surges or fluctuations in the fluid being conveyed.

In operation of the control valve 10, the equalizing fluid can be relieved from the diaphragm chamber 24c in preferably a controlled manner to urge the diaphragm member 100 to the fully open or actuated position, in which the diaphragm member 100 is spaced from the seat member 26 thereby permitting the flow of fluid between the inlet 14 and the outlet 16. The fluid release from the diaphragm chamber 24c can be regulated by way of, for example, an electrically controlled solenoid valve, such that the diaphragm member 100 can achieve regulated positions between the fully closed position and the fully open position. Accordingly, the diaphragm member 100 is preferably electrically actuated between the open and closed positions. Alternatively, the diaphragm can be actuated, regulated and/or closed or latched by other mechanisms such as, for example, a mechanical latching mechanism.

Shown in FIGS. 3A-3D is an illustrative embodiment of the diaphragm member 100. The diaphragm member 100 includes an upper surface 102 and a lower surface 104 preferably circumscribed by a flange portion 101 having a bolt pattern for being compressed and secured between the cover 12a and lower valve body 12b. Each of the upper and lower surface areas 102, 104 are generally sufficient in size to seal off communication of the inlet and outlet chamber 24a, 24b from the diaphragm chamber 24c. The upper and lower surface areas 102, 104 are preferably substantially circular in plan view however other geometries are possible depending on the geometry of the chamber 24 and provided that the surfaces effectively dissect and seal the chamber 24. An exemplary configuration of the upper surface 102 of the diaphragm member 100 is shown and described in U.S. Pat. No. 7,059,578. Accordingly, the upper surface 102 preferably includes a centralized or interior ring element 105 and radially extending therefrom are one or more tangential rib members 106. The tangential ribs 106 and interior ring 105 are configured to urge the diaphragm 100 to the sealing position upon, for example, application of an equalizing fluid to the upper surface 102 of the diaphragm member 100. The diaphragm 100 preferably defines a central axis A-A about which the rib members 106 are preferably disposed. Alternate configurations of the upper surface 102 is possible.

Additionally, the diaphragm 100 preferably includes an outer elastomeric ring element 108 to further urge the diaphragm member 100 to the closed position. In the complete assembly of the valve 10, as seen for example in FIG. 2A, the outer preferably angled surface of the flexible ring element 108 engages and provides pressure contact with a portion of the valve body 12 such as, for example, the interior surface of the cover 12a. Thus, the flexible ring element 108 assists in urging the diaphragm 100 towards its sealing position to permit closure of the valve.

Another exemplary configuration of the upper surface 102 of the diaphragm member 100 is shown and described in U.S. Pat. No. 6,095,484. More specifically, the upper surface can include a plurality alternatively or in addition to a plurality of ribs (not shown) in a ring arrangement and located centrally atop the upper surface 102 of the diaphragm member 100. The ring arrangement is preferably configured to engage the inner surface of the cover 12a and apply a force urging the diaphragm member 100 toward its closed position.

In its closed position, the lower surface 104 of the diaphragm member 100 preferably defines a centralized bulged portion 110 to avoid excessive stretching of the diaphragm material during diaphragm cycling and to enhance stability in both the upper and lower positions. The lower surface 104 thus preferably presents a substantially convex surface, and more preferably a spherical convex surface, with respect to the seat member 26, having an area A1, and the upper surface 102 presents a substantially concave surface, and more preferably a spherically concave surface with respect to the diaphragm chamber 24c, having an area A2. Upper surface A2 is preferably about equal to A1. Portions of the lower surface 104 act to seal off fluid communication from the other chambers, i.e. a portion of lower surface 104 seals the inlet chamber 24a from the outlet chamber 24b and the diaphragm chamber 24c. Accordingly, substantially convex surfaces are preferably presented to seal off the inlet and outlet chambers 24a and 24b. Moreover, the preferred geometry of the sub-chambers 24a, 24b, 24c relative to one another preferably provides that the areas sealing the inlet and outlet chambers 24a, 24b are about equal, and that the inlet chamber 24a is sealed off by a portion of the lower surface 104 having an area of about ½ A1, and the outlet chamber is sealed off by a portion of the lower surface 104 having an area of about ½ A1. In one preferred embodiment of the diaphragm 100, the lower surface 104 defines a first radius of curvature and the upper surface 102 defines a second radius of curvature. Where the diaphragm 100 includes a middle layer 103, the middle layer can further define a third radius of curvature. The various radii of curvatures can be measured from a common central point or alternatively from different center points. The ratio of the radius of curvature of a lower layer to the radius of curvature of an upper layer is preferably greater than 1 and sufficient to permit the lower surface 104 to engage the seat member 26 when the diaphragm 100 is in the lower position to adequately seal off the inlet and outlet chambers 24a, 24b. Alternatively or in addition to, the lower surface 104 can further define more than one radius of curvature such that the lower surface 104 engages the seat member 26 in a sealing manner.

In one preferred embodiment of the diaphragm member 100 for use in a valve body having a nominal valve size of four inches (4 in.), the middle layer defines a radius of curvature of about 7.75 inches to about eight inches (8 in.) and is preferably about 7.95 inches. The upper surface 102 preferably defines a radius of curvature of about 7.5 inches to about 7.75 inches and is preferably about 7.6 inches. Each of the radii of curvatures for the middle layer 103 and the upper surface 102 is preferably measured from a common central point along the central axis A-A of diaphragm member 100. Thus, the ratio of the radii of curvatures of the middle layer 103 to the upper surface 102 in a preferred four inch (4 in.) valve is about 1.05:1. In addition, the lower surface 104 preferably defines at least one radius of curvature ranging from about 4.25 inches to about 4.5 inches and is preferably about 4.33 inches measured from a center point off-set from the central axis A-A of the diaphragm member 100. More preferably, the center point is horizontally off-set from the central axis by about 1.4 inches and vertically off-set from the elastomeric ring by about 2.1 inches. Moreover, the bulged portion 110 preferably defines a diameter ranging from about 10.10 inches to about 11.10 inches and is preferably about 10.47 inches. The elastomeric ring element 108 preferably defines an outer diameter ranging from about 10.20 inches to about 10.5 inches and is preferably about 10.24 inches and more preferably about 10.34 inches. The elastomeric ring element 108 preferably defines an inner diameter of about 9.25 inches to about 9.5 inches and is preferably about 9.45 inches and more preferably about 9.29 inches. The overall height of the diaphragm from the upper surface of the elastomeric ring element 108 to the lower surface 104 ranges from about 3.5 inches to about 2.75 inches and preferably ranges from about 2.95 inches to about 3.35 inches.

In one preferred embodiment of the diaphragm member 100 for use in a valve body having a nominal valve size of six inches (6 in.), the middle layer 103 defines a radius of curvature of about 8.5 inches to about 9 inches and is preferably about 8.78 inches and even more preferably about 9.06 inches. The upper surface 102 preferably defines a radius of curvature of about 8.25 inches to about 8.75 inches and is preferably about 8.58 inches. Each of the radii of curvatures for the middle layer 103 and the upper surface 102 is preferably measured from a common central point along the central axis A-A of diaphragm member 100. Thus, the ratio of the radii of curvatures of the middle layer 103 to the upper surface 102 in a preferred six inch (6 in.) valve is about 1.03:1. In addition, the lower surface 104 preferably defines at least one radius of curvature ranging from about 5.25 inches to about 5.5 inches and is preferably about 5.3 inches measured from a center point off-set from the central axis A-A of the diaphragm member 100. More preferably, the center point is horizontally off-set from the central axis by about 1.6 inches and vertically off-set from the elastomeric ring by about 2.4 inches. Moreover, the bulged portion 110 preferably defines a diameter ranging from about 12.45 inches to about 13.75 inches and is preferably about 12.9 inches. The elastomeric ring element 108 preferably defines an outer diameter ranging from about 11.51 inches to about 13.51 inches and is preferably about 12 inches and more preferably about 12.51 inches. The elastomeric ring element 108 preferably defines an inner diameter of about 10.42 inches to about 12.42 inches and is preferably about 12 inches and more preferably about 11.42 inches. The overall height of the diaphragm from the upper surface of the elastomeric ring element 108 to the lower surface 104 ranges from about 3.5 inches to about 4.5 inches and preferably ranges from about 3.82 inches to about 4.21 inches. The preferred diaphragm member 100 is configured to engage and cooperate with the inner surfaces of the cover 12a and lower body 12b to define the three chambers 24a, 24b, 24c in an orientation that can provide for a diaphragm chamber 24c that can effectively compensate for fluctuation and/or surges in fluid pressure in either one of the inlet and outlet chambers 24a, 24b.

Figure 3A:
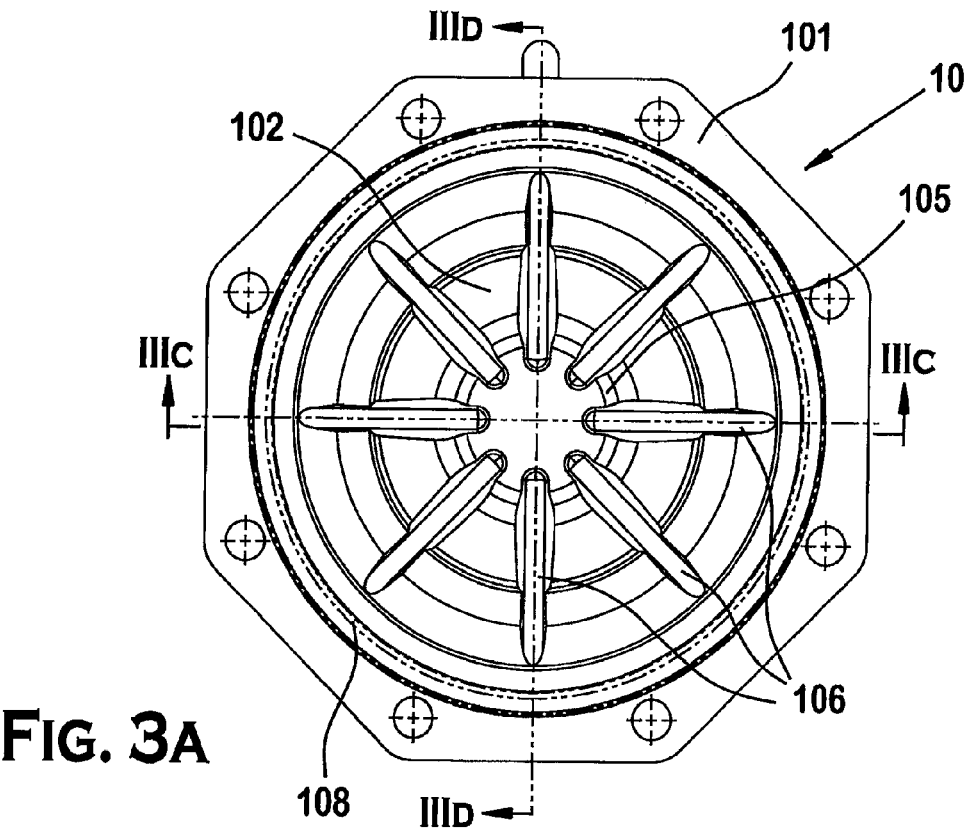
Figure 3B:
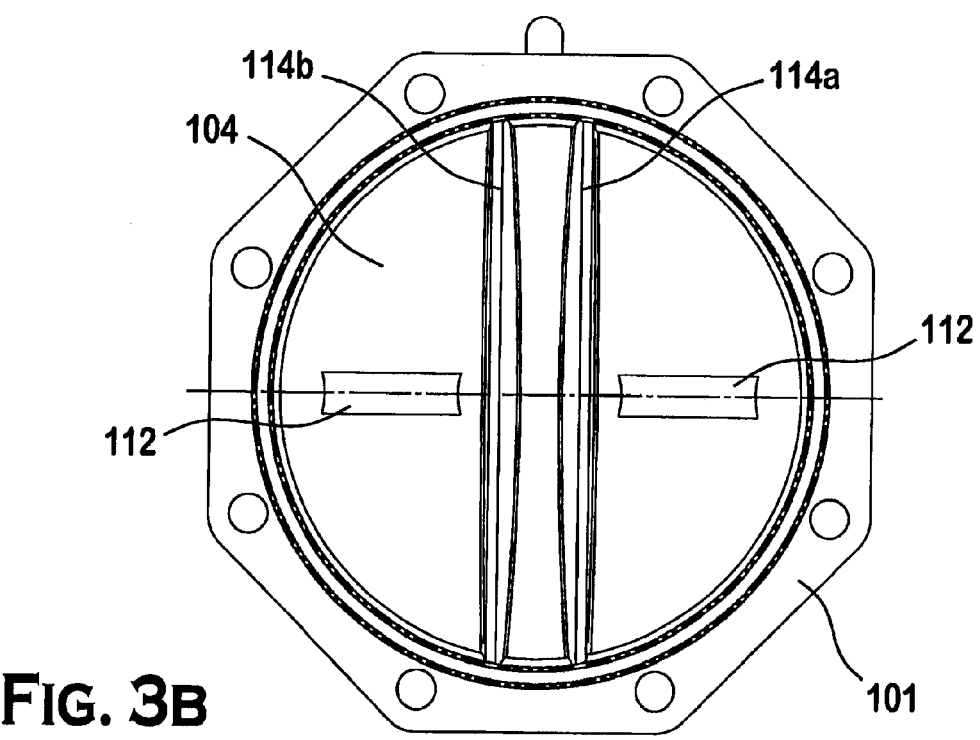
Figure 3C:
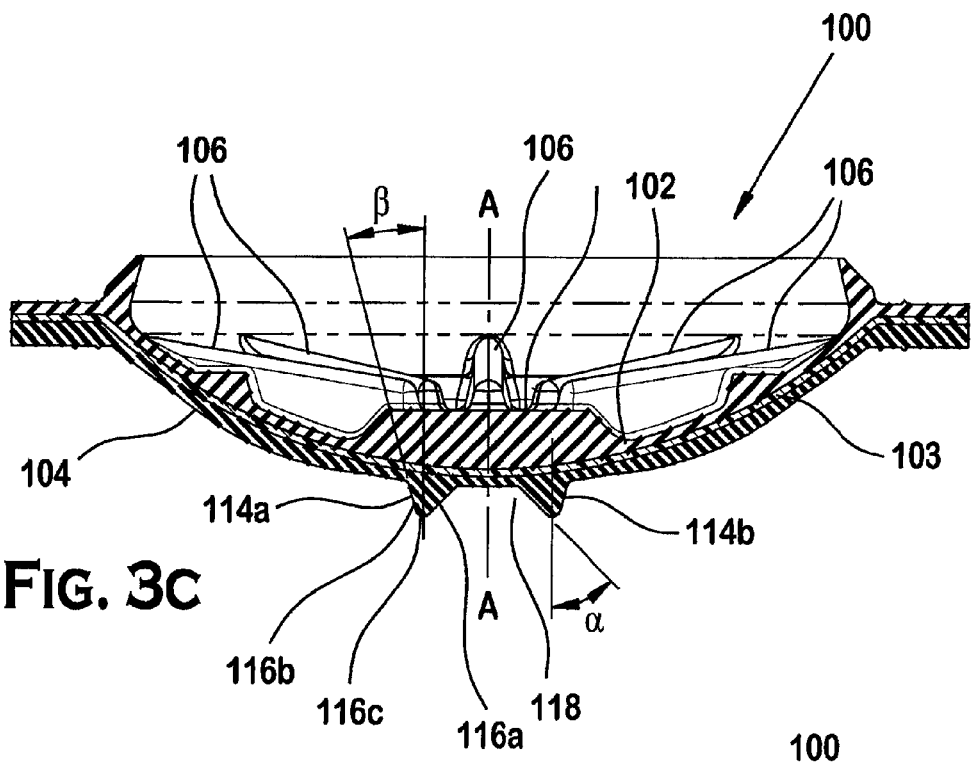
Figure 3D:
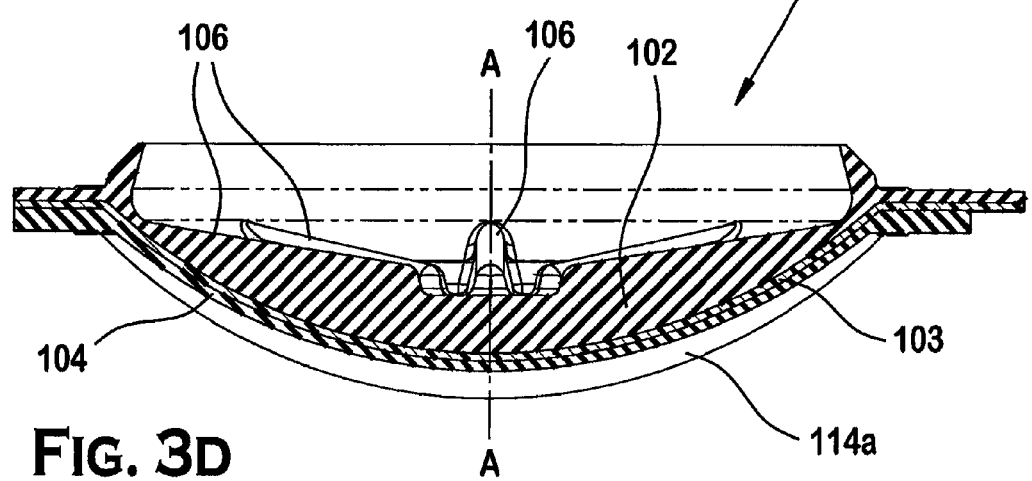

The lower surface 104 of the diaphragm member 100, as seen more specifically in FIG. 3B, preferably includes one or more support pads or elements 112 for supporting the diaphragm member 100 when the diaphragm cycles between the open and closed positions within the chamber 24. More specifically, the support pads 112 are configured to engage a portion of the inner surface of the lower valve body 12b to support the diaphragm 100.

The lower surface 104 of the diaphragm member further preferably includes a pair of elongated sealing elements or projections 114a, 114b to form a sealed engagement with the seat member 26 of the valve body 12. The sealing elements 114a, 114b preferably extend in a parallel fashion along the lower surface 104 for a length about equivalent to the maximum arc length defined by the surface 104. Each of the elongated sealing elements 114a, 114b preferably taper narrowly in cross-section (perpendicular to the axis of elongation) having a first angled surface 116a and a second angled surface 116b each extending from or contiguous with the lower surface 104, as seen for example in FIG. 3C. Alternatively, the sealing elements 114a, 114b can define any cross-sectional geometry provided the sealing element provides the sealing function provided herein. The first angled surface 116a preferably defines an included angle $\alpha$ with a line parallel to the central axis A-A of about forty-five degrees. The second angled surface 116b preferably defines an included angle $\beta$ with a line parallel to the central axis A-A of about fifteen degrees. Disposed between the first and second angled surfaces 116a, 116b is a terminal surface 116c to terminate the sealing element and thereby define the height of the projection. Preferably, the terminal surface 116c defines a surface having one or more radii of curvature over its length from the first angled surface to the second angled surface. More preferably, the terminal surface 116c defines a peak of the sealing element having at least one radius of curvature.

The sealing elements 114a, 114b are preferably spaced apart so as to define a void or channel 118 therebetween. The parallel first angled surfaces 116a of the sealing elements 114a, 114b along with a portion of the lower surface 104 disposed therebetween further define the sidewalls of the void or channel 118 and its channel height. The sealing elements 114a, 114b are configured to engage the seat member 26 of the valve body 12 when the diaphragm is in the closed position so as to seal off communication between the inlet 14 and the outlet 16 and more specifically seal off communication between the inlet chamber 24a and the outlet chamber 24b. Furthermore, the sealing members 114a, 114b engage the seat member such that the channel 118 cooperates with the seat member 26 to form an intermediate chamber 24d to axially space the inlet chamber 24a and the outlet chamber 24b in a manner described in greater detail herein below. The lower surface 104 of the diaphragm can include more than two sealing elements 114a, 114b provided that the additional sealing elements cooperate with the seat member 26 in a sealing fashion and allow for the formation of the intermediate chamber. Moreover, the lower surface 104 can be formed or constructed with any other surface formation, such as a convolution, provided that the formation can effectively form a sealed engagement with the seat member 26 and further provide for the channel 118 to facilitate formation of the intermediate chamber 24d.

The material to be used for manufacturing the diaphragm 100 is dependent on the type of fluid being carried on and on the temperature range to which the diaphragm is to be exposed. Preferably, the upper and lower surfaces 102, 104 of the diaphragm 100 are constructed from layers of natural rubber material having a durometer hardness or shore value of about seventy-five (75) and further a pressure rating of about 2560 pounds per square inch (2560 psi.). Suitable materials for use at the upper and lower surfaces 102, 104 include, for example, nitrile butadiene rubber and neoprene. Materials that can be used for reinforcements between the upper and lower surface layers at middle layer 103 of the diaphragm 100 include, for example, cotton and nylon and more preferably, nylon no. 2 reinforced material.

The sealing elements 114a, 114b of the diaphragm member 100 are configured to form a sealed engagement with the seat member 26 of the valve body 12. Shown in FIGS. 4A-4D are detailed views of the preferred lower valve body portion 12b of the control valve 10. The lower control valve body 12b preferably defines a first valve axis IVC-IVC. The inlet and outlet 14, 16 of the control body are preferably centered about, coaxial with and spaced apart along the first valve axis IVC-IVC. Further centered along, spaced apart and substantially orthogonal to the first axis IVC-IVC are the fluid drain pipe 18 and the input opening 20 each respectively in communication with the fluid supply chamber 24a and the pressurized gas supply chamber 24b. Also extending along the first axis IVC-IVC are brace or support members 28a, 28b. The support members 28a, 28b are preferably aligned for engagement with the support pads 112 disposed or formed on the lower surface 104 of the diaphragm member 100. The support members 28a, 28b preferably extend from the flanges of the inlet and outlet 14, 16 to intersect the support member 26. The support members 28a, 28b preferably form a unitary construction with the support member 26 and the rest of the lower valve body 12b, or alternatively, the support members 28a, 28b can be joined to the support member 26 and the body 12 by other joining techniques such as, for example, welding.

The lower control valve body 12b further preferably defines a second axis IVD-IVD which is substantially orthogonal to the first axis IVC-IVC. Preferably aligned with the second axis IVD-IVD is the seat member 26 extending the width of the valve body 12 so as to effectively divide the chamber 24 in the lower valve body 12 into the preferably spaced apart and preferably equal sized sub-chambers of the inlet chamber 24a and the outlet chamber 24b. Moreover, the elongation of the seat member 26 preferably defines a curvilinear surface or arc having an arc length to mirror the convex surface of the lower surface 104 of the diaphragm 100. Further extending along the preferred arc length of the seat member 26 is a groove 30 constructed or formed in the surface of the seat member 26. The groove 30 preferably extends the full length of the seat member 26 so as to extend the width of the lower valve body 12b. Furthermore, the groove 30 preferably tapers narrowly at its ends. In addition, the walls of the seat member 26 that define the groove 30 are preferably parallel. Alternatively, the groove 30 can be formed such that the walls forming the groove 30 are angled relative to one another, another reference line or other surface in the valve body 12. The portion of the seat surface 26 defining the bottom of the groove 30 preferably forms a semi-circular arc in the plane perpendicular to the direction of elongation for the groove 30. Other geometries are possible provided the channel 30 delivers the desired fluid and pneumatic characteristics described herein. Moreover, the depth of the groove 30 can vary along its length such that the groove 30 is preferably deepest at its center and becomes more shallow toward its lateral ends. The groove 30 further bisects the engagement surface of the seat member 26 preferably evenly along the seat member length. With the support pads 112 of the diaphragm member 100 aligned to engage the support members 28a, 28b when the diaphragm member 100 is in the closed positioned, the elongated sealing members 114a, 114b are preferably aligned to engage the bisected surface of the seat members 26. Engagement of the sealing members 114a, 114b with the engagement surfaces 26a, 26b of the seat member 26 further places the channel 118 of the diaphragm 100 in communication with the groove 30.

Figure 4A:
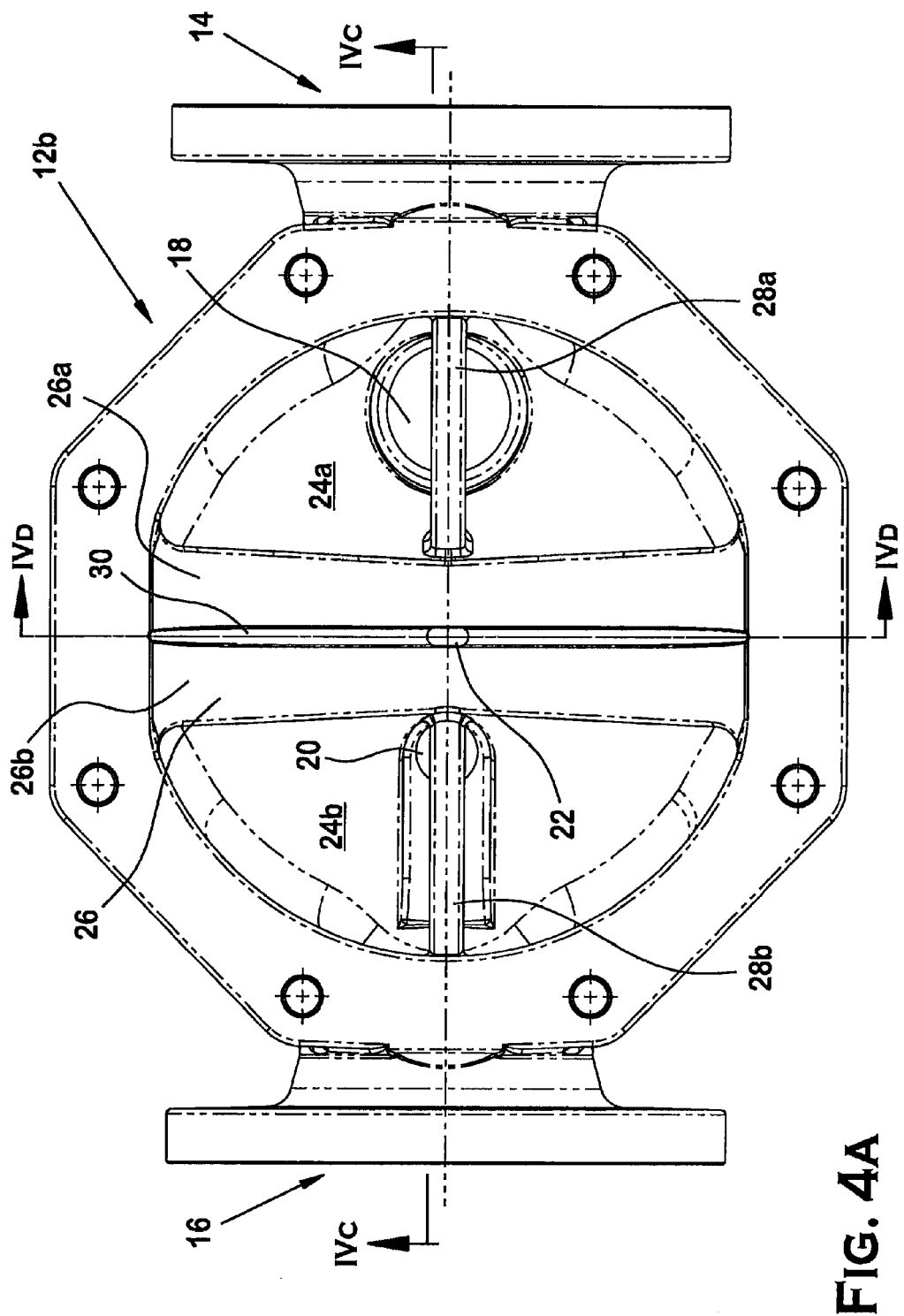
FIG. 4B is a cross-sectional detailed view of the lower valve body in FIG. 4A.
FIG. 4C is a cross-sectional view of the lower valve body along axis IVC-IVC in FIG. 4A.
FIG. 4D is another cross-sectional view of the lower valve body along axis IVD-IVD in FIG. 4A.
Figure 4B:
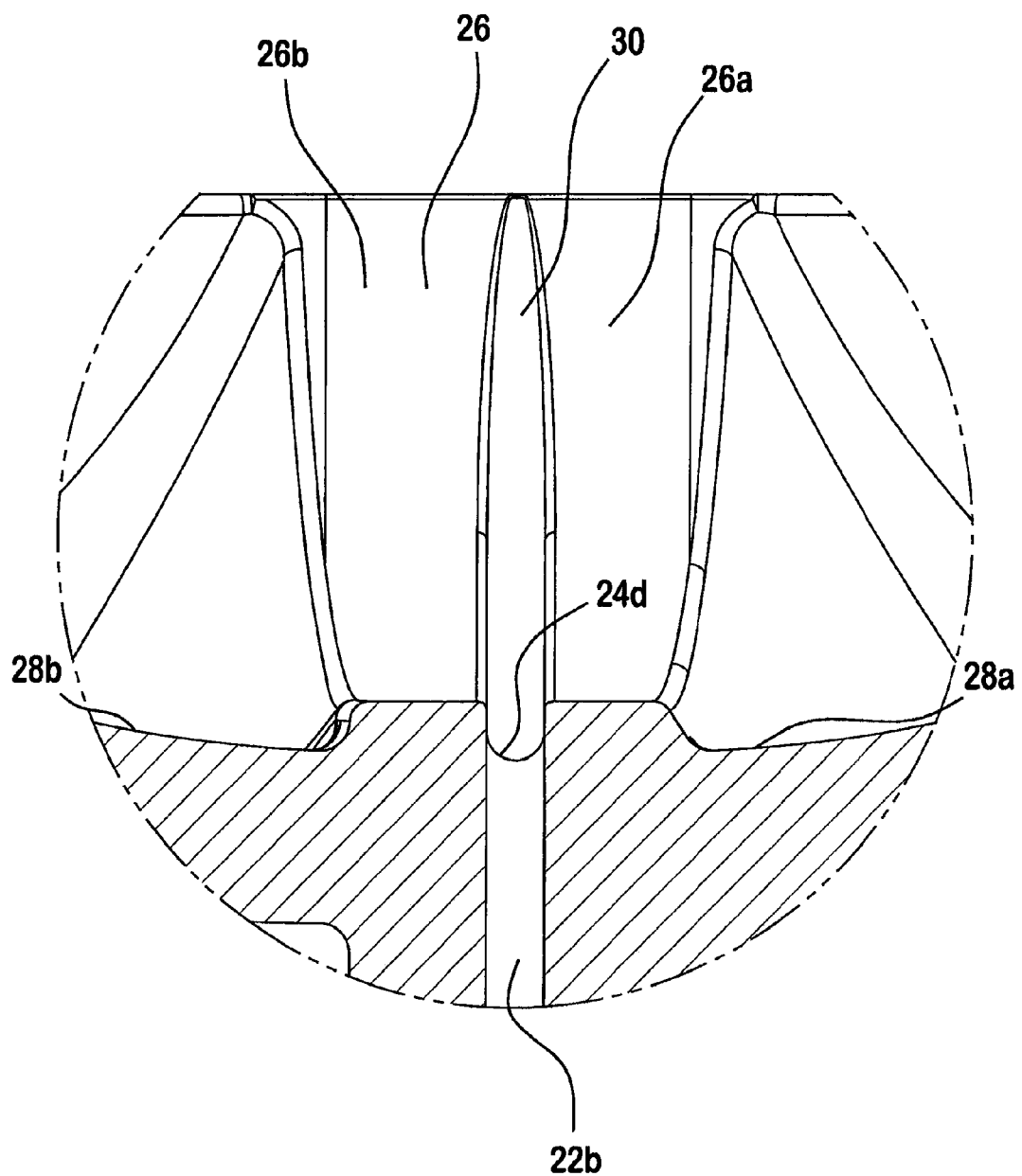
Figure 4C:
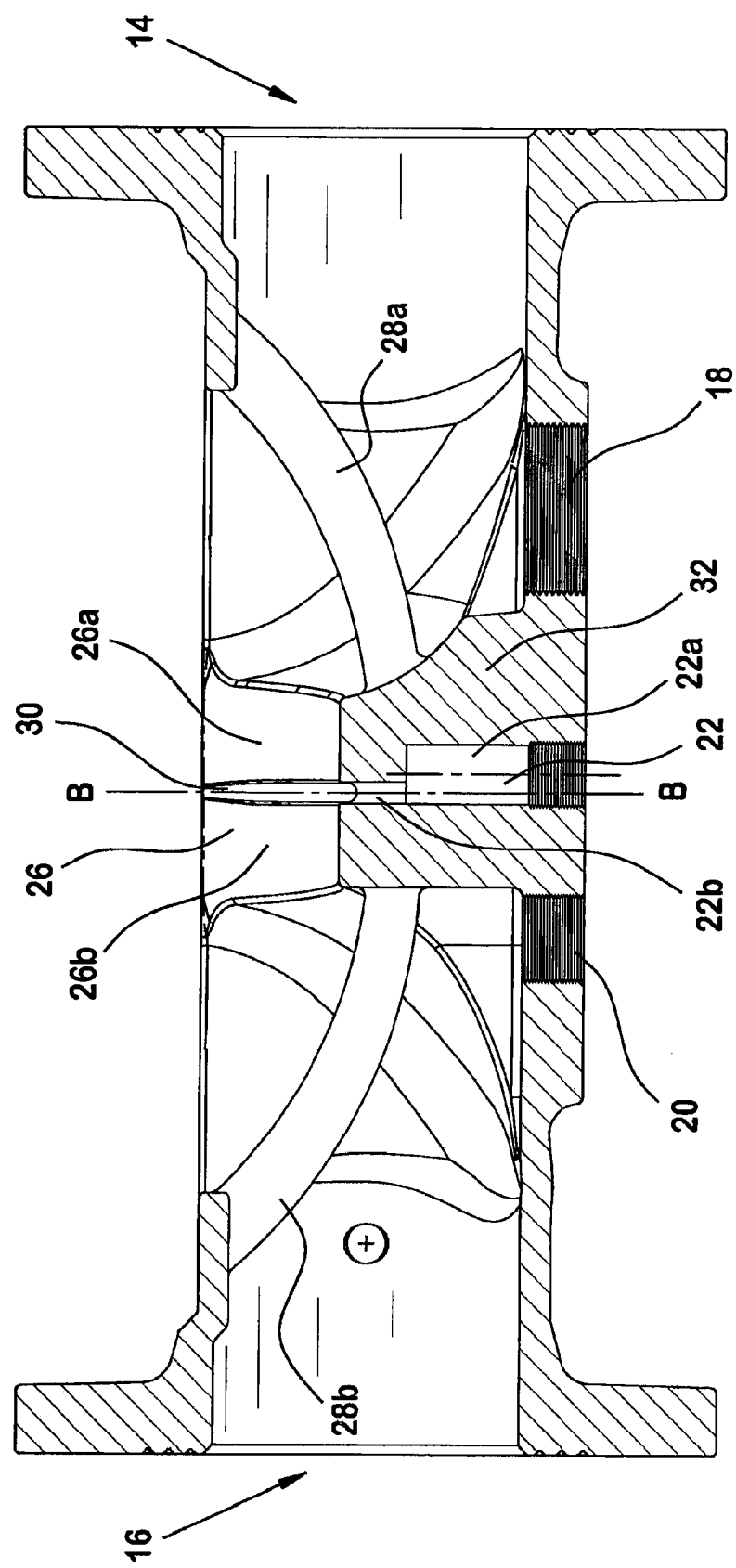
Figure 4D:
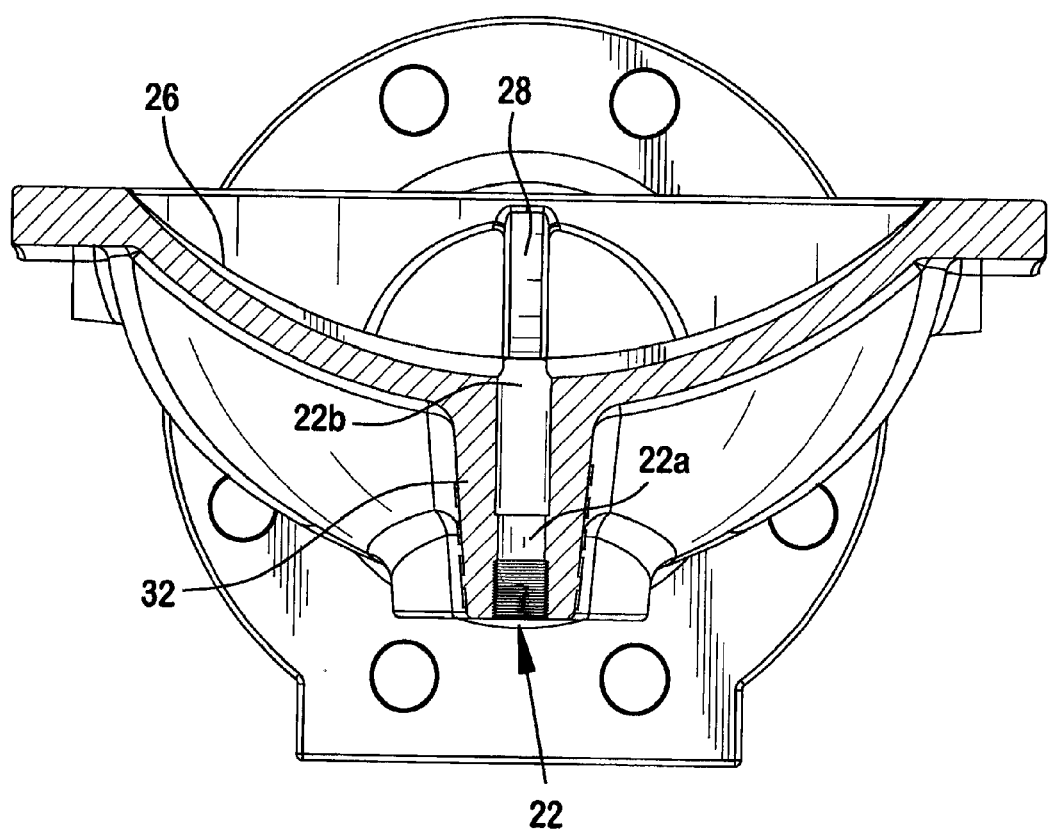

Shown in FIG. 4B is a detailed view of the seat member 26 and its intersection with the support members 28a, 28b. Preferably, the engagement surfaces 26a, 26b of the seat member 26 are substantially planar, and the width of the engagement further preferably widens in a direction from the center of the engagement seat 26 to the lateral ends of the seat member 26. Generally, the surfaces 26a, 26b are configured sufficiently wide over their entire length so as to maintain sealing contact with the sealing elements 114a, 114b. Moreover, the surfaces 26a, 26b are configured wide enough so as to maintain sealing contact with the sealing elements 114a, 114b regardless of any movement of the sealing elements 114a, 114b along the longitudinal axis IVC-IVC. Accordingly, the surfaces 26a, 26b can maintain sealed engagement with the sealing elements 114a, 114b despite changes in fluid pressure in either the inlet or outlet chamber 24a, 24b which can impose forces on the diaphragm 100 and sealing elements 114a, 114b in a direction along the axis IVC-IVC.

The seat member 26 is preferably formed with a central base member 32 that further separates and preferably spaces the inlet and outlet chambers 24a, 24b and diverts fluid in a direction between the diaphragm 100 and the seat member engagement surfaces 26a, 26b. As seen, for example, in FIGS. 4C and 4D, the base member 32 is preferably broader in the direction along the first axis IVC-IVC than along the second axis IVD-IVD. The base member 32 is preferably substantially aligned with the central axis B-B of the valve body 12 which intersects substantially orthogonally the plane formed by the intersection of the first axis IVC-IVC and the second axis IVD-IVD. Preferably formed in the base member 32 between the drain 18 and the input opening 20 is the port 22.

The port 22 is preferably constructed as an alarm port from one or more voids formed in the base member 32. Preferably, the port 22 includes a first cylindrical portion 22a formed in the base member 32. The first cylindrical portion 22a preferably defines a central axis off-set or spaced from the central axis B-B of the lower valve body 12. The first cylindrical portion 22a is further preferably wider in the direction along the first axis IVC-IVC than in the direction along the second axis IVD-IVD. Accordingly, the first cylindrical portion 22a is preferably oblong in cross-section.

Axially in communication with the first cylindrical portion 22a is a second cylindrical portion 22b formed in the base member 32. The second cylindrical portion 22b is preferably wider in the direction along the second axis IVD-IVD than in the direction along the first axis IVC-IVC. Accordingly, the second cylindrical portion 22b is oblong in cross-section and preferably elongated in a direction substantially orthogonal to the direction of elongation of the first cylindrical portion 22a. The second cylindrical portion 22b preferably defines a central axis preferably aligned with the central axis B-B of the lower valve body 12. Moreover, the second cylindrical portion 22b preferably axially extends along the central axis B-B so as to intersect and be in communication with the groove 30. Accordingly, the port 22 preferably intersects and is in communication with the groove 30, and wherein when the diaphragm member 100 is in the closed position, the port 22 is further preferably in sealed communication with the channel 118 formed in the diaphragm member 100.

The communication between the diaphragm channel 118, the groove 30 and the port 22 is preferably bound by the sealed engagement of the sealing elements 114a, 114b with the seat member surfaces 26a, 26b, to thereby define a preferred fourth chamber, intermediate chamber 24d, as seen, for example, in FIG. 2A. The intermediate chamber 24d is preferably open to atmosphere thereby further defining a fluid seat, preferably an air seat to separate the inlet and outlet chambers 24a, 24b. The inventors have discovered that providing an air seat between the inlet and outlet chambers 24a, 24b allows each of the inlet and outlet chambers to be filled and pressurized while avoiding failure of the sealed engagement between the sealing element 114 and the seat member 26. Each sealing element 114 is acted upon by a fluid force on only one side of the element and preferably atmospheric pressure on the other, the fluid pressure in the diaphragm chamber 24c is effective to maintain the sealed engagement between the sealing elements 114 and the seat member 26 during pressurization of the inlet and outlet chambers 24a, 24b. Accordingly, the preferred diaphragm-type valve 10 can eliminate the need for a check valve downstream of the control valve, unlike, for example, the installations of the preaction fire protection systems shown and described in U.S. Provisional Patent Application No. 60/887,040. Moreover, the preferred control valve 10 and the preferred intermediate chamber 24d exposed to atmosphere can comply with the installation and/or operational requirements such as for example, FM Standard 1020, by providing a port for drainage or an alarm.

Figure 5:
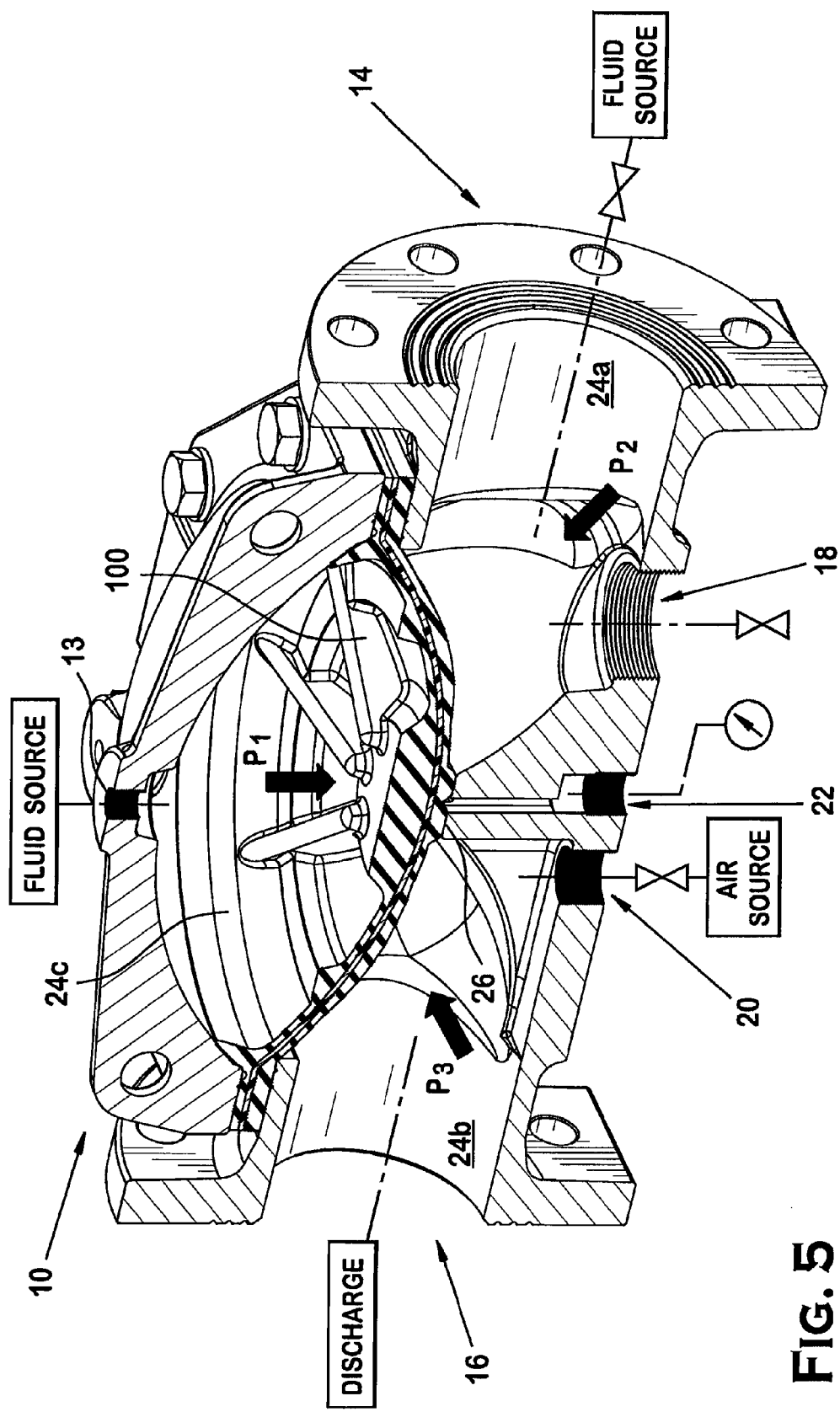
FIG. 5 is cross-sectional perspective schematic view of the control valve of FIG. 1 installed in a preferred piping manifold.

The ability to pressurize both the inlet and the outlet chambers 24a, 24b is particularly useful where it is desirable to control release of a primary fluid such as, for example, water, into a normally closed system while providing and maintaining the system with a pressurized secondary fluid such as, for example, compressed air. For example, the control valve 10 can be installed and operated in a liquid/gas manifold in the following manner. The control valve 10 is disposed between the primary fluid source, such as for example, a water main and a the secondary fluid source, such as for example, a compressed air feed or a source of compressed nitrogen gas. More specifically, as schematically shown, for example, in FIG. 5, the control valve 10 is preferably coupled to the primary fluid main at the inlet 14. The fluid drain 18 is preferably closed off by connection of an appropriate shut-off piping element such as, for example, a manual-shut off valve. The secondary fluid or compressed gas source is coupled to the input opening 20, and the outlet 16 is preferably coupled to the system to be filled and pressurized by the compressed gas.

The control valve 10 and the manifold can be placed into service by preferably bringing the valve 10 to the normally closed position and subsequently bringing the inlet chamber 24a and the outlet chamber 24b to operating pressure. In one preferred installation, the primary fluid source is initially isolated from the inlet chamber 24a by way of a shut-off control valve such as, for example, a manual control valve located upstream from the inlet 14. The secondary fluid source is preferably initially isolated from the outlet chamber 24b by way of a shut-off control valve located upstream from the input opening 20. An equalizing fluid, such as water from the primary fluid source is then preferably introduced into the diaphragm chamber 24c through the central opening 13 in the cover 12a. Fluid is continuously introduced into the chamber 24c until the fluid exerts enough pressure P1 to bring the diaphragm member 100 to the closed position in which the lower surface 104 engages the seat member 26 and the sealing elements 114a, 114b form a sealed engagement about the seat member 26.

With the diaphragm member 100 in the closed position, the inlet and outlet chambers 24a, 24b can be pressurized respectively by the primary and secondary fluids. More specifically, the shut-off valve isolating the primary fluid can be opened so as to introduce fluid through the inlet 14 and into the inlet chamber 24a to preferably achieve a static pressure P2. The shut-off valve isolating the compressed gas can be opened to introduce the secondary fluid through the input opening 20 to pressurize the outlet chamber 24b and the normally closed system coupled to the outlet 16 of the control valve 10 to achieve a static pressure P3.

As described above, the presence of the intermediate chamber 24d separating the inlet and outlet chamber 24a, 24b and which is normally open to atmosphere, maintains the primary fluid pressure P2 to one side of the sealing member 114a and the secondary fluid pressure P3 to one side of the other sealing member 114b. Thus, diaphragm member 100 and its sealing members 114a, 114b are configured so as to maintain the sealed engagement with the seat member 26 under the influence of the diaphragm chamber pressure P1. Accordingly, the upper and lower diaphragm surface areas A1, A2, and A3 are preferably sized such that the pressure P1 is large enough to provide a closing force on the upper surface of the diaphragm member 100 so as to overcome the primary and secondary fluid pressures P2, P3 urging the diaphragm member 100 to the open position. However, preferably the ratio of the diaphragm pressure to either the primary fluid pressure P1:P2 or the secondary fluid pressure P1:P3 is minimized such that the valve 10 maintains a fast opening response, i.e. a low trip ratio, to release fluid from the inlet chamber when needed. More preferably, every 1 psi of diaphragm pressure P1 is at least effective to seal about 1.2 psi of primary fluid pressure P2. This is an advantage over known diaphragm valves that are believed to require a 1:2.5 pressure ratio of diaphragm pressure to primary fluid pressure because in such known valves, the chambers are oriented such that the diaphragm pressure is directed completely in the normal direction to the diaphragm seat and the incoming fluid. Known mechanical latching deluge valves also are believed to require a 1:2.5 ratio because of similar chamber orientation and the need for a mechanical latch or linkage. Because the preferred control valve 10 can use a lower diaphragm pressure P1 to primary fluid pressure P2, the valve 10 can be constructed smaller than the known control valves of similar nominal valve size. Moreover, the low pressure ratio, in combination with the chamber orientation and flexible diaphragm provides for the preferred control valve 10 that is capable of providing effective surge control or resistance to minimizing or more preferably eliminate false trips.

To actuate the valve 10, fluid is preferably released from the diaphragm chamber 24c at a faster rate than it can be replenished into the chamber 24c. For example, a solenoid control valve coupled to the chamber inlet 13 can be electrically actuated to release fluid from the diaphragm chamber 24c. The loss of pressure on the upper surface 102 of the diaphragm member 100 permits the fluid pressure in the adjacent fluid supply chamber 24a to urge the diaphragm member to the open position spaced from the seat member 26. Fluid is permitted to flow past the support members 28a, 28b (support members 28a, 28b not shown in FIG. 5 for clarity) to displace the compressed gas in the outlet chamber 24b for discharge out the outlet 16 and into the system coupled to the control valve 10. Fluid is further permitted to fill the groove 30 and flow out the alarm port 22. With an appropriate flow alarm coupled to the port 22, fluid flow can be detected and appropriate personnel can be notified of the operation of the valve 10.

Figure 6:
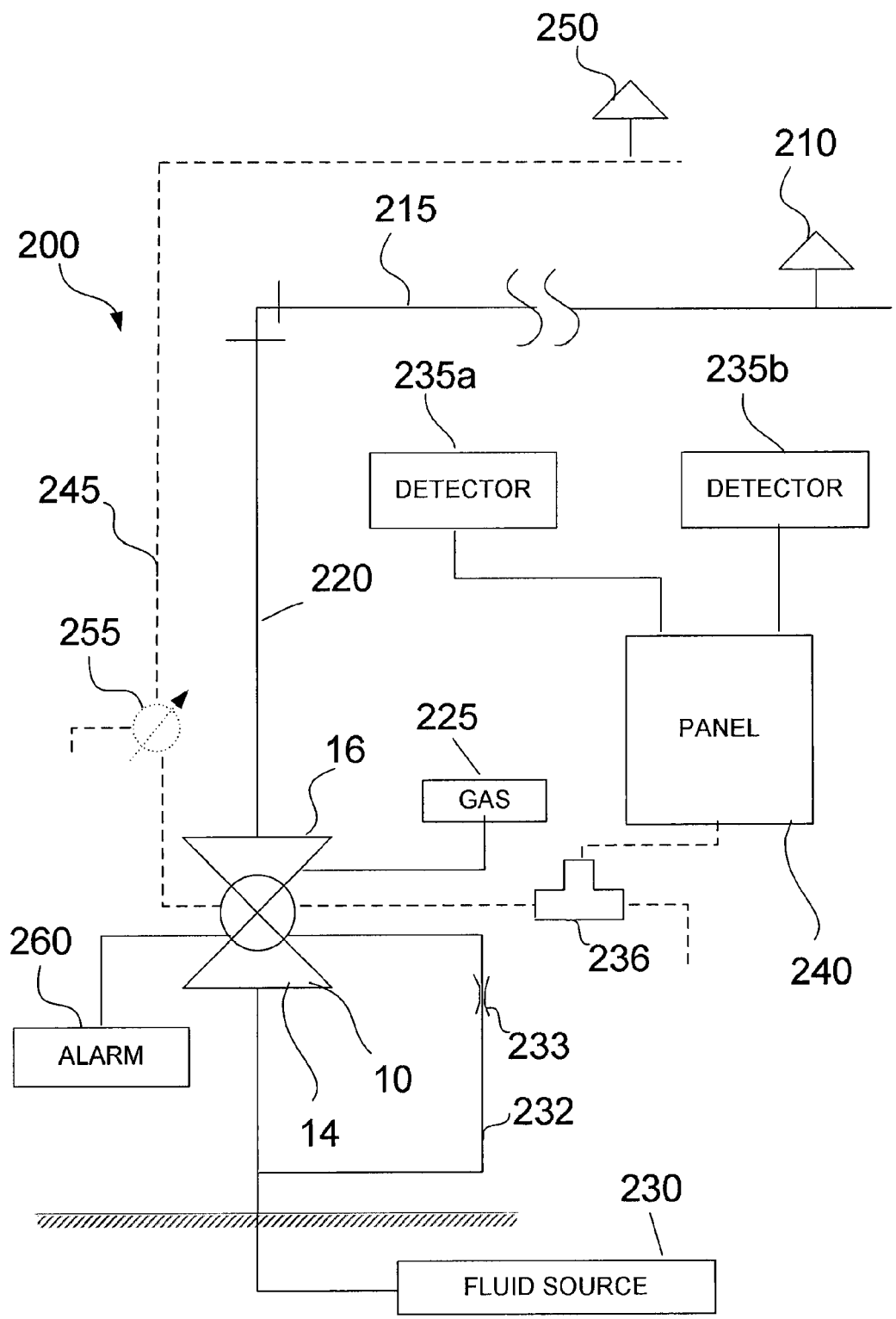
FIG. 6 is a schematic view of another preferred installation of the control valve of FIG. 1.

Accordingly, the control valve 10 can be installed in a preaction fire protection systems with its outlet 16 in communication with a riser pipe that is coupled to a network of sprinklers interconnected by pipes and pressurized by the compressed gas or air. More specifically, the control valve 10 can be installed in any one of the preaction fire protection systems shown and described in U.S. Provisional Patent Application No. 60/887,040 without the need for a check valve located down stream of the valve 10. Schematically shown in FIG. 6A is the preferred controlled valve 10 installed in a preaction fire protection system 200. In addition to the control valve 10, the preaction system 200 includes a piping network of one or more fire protection devices, such as for example, fire protection sprinklers 210 distributed along a feed main 215 in accordance with one or more fire sprinkler installation standards, such as for example, National Fire Protection Association (NFPA) publication, "NFPA 13: Standard for the Installation of Sprinkler Systems" (2007).

In accordance with the preferred installation described above, the control valve 10 is installed in the fire protection system with its outlet coupled to the network of sprinklers 210 and feed main by a riser pipe 220. A compressed gas or air source 225 is placed in controlled communication with the input opening 20 for pressurizing the network of sprinklers with supervisory air or gas preferably ranging from about 8-12 psi. and more preferably about 10 psi. Alternatively, the preferred control valve 10 can be installed in a deluge fire protection system in which the network of sprinklers is open to atmosphere. The inlet 14 of the control valve 10 is preferably placed in controlled communication with a preferred liquid supply source, such as for example, a water main 230. Accordingly, the control valve 10 is installed such that the "wet" or liquid portion of the system is at the inlet side of the valve 10 and the "dry" or gas portion of the system is on the outlet side of the valve 10. The control valve 10 and the system 200 can be placed into service in a manner as described above such that the diaphragm member 100 provides controlled sealed communication between the water main 230 and the network of sprinklers 210. Moreover, the diaphragm can be brought to the sealed position by the introduction of the fluid, preferably appropriately piped and trimmed from the fluid source 230 through an appropriate restriction 233, into the diaphragm chamber 24c, and each of the inlet and outlet chambers 24a, 24b can be brought to pressure by respective introduction of water into the inlet 14 and compressed air into the outlet 14. More preferably, the diaphragm 100 is held in its sealed position with the inlet chamber 24a under static pressure from the water such that the sealing pressure and the static water pressure define the preferred ratio of P1: P2 substantially equal to about 1:1.2. Because the preferred control valve 10, upon seating in the sealed position, forms the intermediate chamber 24d to act as an air seat, the outlet chamber 24b and the network of normally closed sprinklers define a closed system in the preaction system in which incoming compressed air can fill the riser 220, the main feed 215 and provide supervisory air to the network of sprinklers at the preferred pressure without the use of a check valve anywhere down stream of the valve 10. Accordingly, between the outlet chamber 24b of the control valve 10 and the network of sprinklers 210 a single and preferably substantially constant air pressure can be defined equivalent to the supervisory air of the system 200.

The system 200 can be configured for single or double interlock operation of the control valve 10. Furthermore, the operation of the control valve 10 can be electrically, pneumatically, hydraulically actuated or a combination thereof. For example, the system 200 can be configured as a single interlock system having a detector 235a for detection of heat or smoke to send a detection signal, preferably through a control panel 240, to a solenoid valve 236, vented to atmosphere, that releases water from the diaphragm chamber 24c for actuation of the control valve 10 as discussed above. The detector 235a can be any one of a heat sensitive thermostat, smoke detector or electric manual pull station. Alternatively, the system 200 can be configured as a single interlock system having dry pilot for actuation of the control valve 10. More specifically, the system 200 can include a dry pilot line 245 that is pneumatically pressurized having one or more pilot sprinklers 250 acting as heat detectors disposed along the line 245. Upon actuation of the pilot sprinklers 250 in the presence of a fire, the release of pneumatic pressure can be configured to operate a dry pilot actuator 255, vented to atmosphere, which can be coupled to the control valve 10 to release water from the diaphragm chamber 24c. Further in the alternative, the pilot line can be configured as an appropriately installed wet pilot line pressurized with water and coupled to the diaphragm chamber 24c. Actuation of the pilot sprinkler 250 in the presence of a fire releases water from the wet pilot line 245 and from the diaphragm chamber 24c for operation of the control valve 10.

Any one of the above single interlock systems can be alternatively configured as a double interlock system. For example, the system 200 can be configured as a double interlock system having a detector 235a for detection of heat or smoke to send a detection signal and a second detector 235b for detecting low air pressure in the network of sprinklers 210. Each of the detectors 235a, 235b can be coupled to a releasing panel in which actuation of each of the detectors is required to operate the releasing panel to release water from the diaphragm chamber 24c and operate the control valve 10. Alternatively, the system 200 can be configured as a double interlock system having dry pilot and an electrical interlock for actuation of the control valve 10. More specifically, the system 200 can include a dry pilot line 245 that is pneumatically pressurized having one or more pilot sprinklers 250 acting as heat detectors disposed along the line. Upon actuation of the pilot sprinklers 250 in the presence of a fire, the release of pneumatic pressure can be configured to operate a dry pilot actuator 255. To operate the control valve 10 the system can incorporate the heat detector for energizing a solenoid valve that in series with the dry pilot actuator 255 operates the control valve 10. In the alternative, the pilot line of the double interlock system can be configured as a wet pilot line pressurized with water and coupled to the diaphragm chamber 24c. Anyone of the above preaction systems preferably includes an alarm connected to the alarm port 22 of the control valve 10 in order to detect the flow of fluid upon actuation of the control valve 10. Further in the alternative, the control valve 10 can be installed in a non-interlock preaction fire protection system.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fluid control valve comprising:
a valve body having a first inner surface defining a chamber having a first axis and a second axis substantially perpendicular to the first axis, the chamber including an inlet and an outlet in communication with the chamber and substantially aligned along the first axis, the inner surface including an elongated seat member substantially aligned along the second axis, the seat member defining a groove, a portion of the body further defining a port in communication with the groove; and
a diaphragm member disposed within the chamber for controlling communication between the inlet and the outlet, the diaphragm member having an upper surface and a lower surface, the lower surface including at least a pair of spaced apart elongated members defining a channel therebetween, the diaphragm member having a first position permitting communication between the inlet and the outlet and a second position wherein the elongated members engage the seat member such that the channel is in communication with the groove to define an intermediate chamber in communication with the port;
wherein the valve body includes an input opening a fluid drain opening disposed about the seat member, the input opening being in communication with the outlet and the fluid drain opening being in communication with the inlet.

2. The fluid control valve of claim 1, wherein the elongated members define a substantially tapering cross-sectional area.

3. The fluid control valve of claim 2, wherein the cross-sectional area tapers narrowly from the lower surface of the diaphragm to a terminal surface.

4. The fluid control valve of claim 3, wherein the terminal surface includes at least one radius of curvature.

5. The fluid control valve of claim 1, wherein the diaphragm member defines a central axis substantially perpendicular to the first and second axis, wherein further each of the elongated members include an angled surface relative to the central axis extending from the lower surface of the diaphragm member to define a sidewall surface of the channel.

6. The fluid control valve of claim 5, wherein each of the angled surfaces defines an angle of about forty-five degrees relative to the central axis.

7. The fluid control valve of claim 1, wherein when the diaphragm is in the second position, the upper surface defines a substantially concave surface and the lower surface defines a convex surface.

8. The fluid control valve of claim 1, wherein the seat member defines a curvilinear surface having an arc length for engaging the lower surface of the diaphragm member, the groove extending along the curvilinear surface for substantially the entire arc length.

9. The fluid control valve of claim 1, wherein the upper surface of the diaphragm member includes a ring element circumscribing the upper surface to engage the inner surface of the valve body to bias the diaphragm in the second position.

10. The fluid control valve of claim 1, wherein the valve body further includes a first brace member and a second brace member, the first and second brace members being disposed about and engaged with the seat member.

11. The fluid control valve of claim 10, wherein the first and second brace members bisect the chamber along the first axis, and the seat member bisects the chamber along the second axis.

12. The fluid control valve of claim 10, wherein the first and second brace members are integrally formed with the seat member.

13. The fluid control valve of claim 1, wherein the port defines a substantially elongated oval cross-section.

14. The fluid control valve comprising:
a valve body having a first inner surface defining a chamber having a first axis and a second axis substantially perpendicular to the first axis, the chamber including an inlet and an outlet in communication with the chamber and substantially aligned along the first axis, the inner surface including an elongated seat member substantially aligned along the second axes, the seat member defining a groove, a portion of the body defining a port in communication with the groove; and
a diaphragm member disposed within the chamber for controlling communication between the inlet and the outlet, the diaphragm member having an upper surface and a lower surface, the lower surface including at least a pair of spaced apart elongated members defining a channel therebetween, the diaphragm member having a first position permitting communication between the inlet and the outlet and a second position wherein the elongated members engage the seat member such that the channel is in communication with the groove to define an intermediate chamber in communication with the port;
wherein the valve body defines a central axis substantially perpendicular to the first and second axes, the port being substantially aligned with the central axis; and
wherein the port has a first portion having a first width opening and a second portion axially aligned with the first portion, the second portion having a second width opening having a width smaller than the first width opening.

15. The fluid control valve of claim 14, wherein the first portion and the second portion are substantially cylindrical each having a central axis, the central axis of the first portion being spaced from the central axis of the second portion.

16. The fluid control valve of claim 14, wherein the second width is defined along the first axis and the second portion defines a third width along the second axis greater than the second width.

17. The fluid control valve of claim 14, wherein the elongated members define a substantially tapering cross-sectional area.

18. The fluid control valve of claim 17, wherein the cross-sectional area tapers narrowly from the lower surface of the diaphragm to a terminal surface.

19. A fluid control valve of claim 18, wherein the terminal surface includes at least one radius of curvature.

20. The fluid control valve of claim 14, wherein the diaphragm member defines a central axis substantially perpendicular to the first and second axis, wherein further each of the elongated members include an angled surface relative to the central axis extending from the lower surface of the diaphragm member to define a sidewall surface of the channel.

21. The fluid control valve of claim 20, wherein each of the angled surfaces defines an angle of about forty-five degrees relative to the central axis.

22. The fluid control valve of claim 14, wherein when the diaphragm is in the second position, upper surface defines a substantially concave surface and the lower section defines a convex surface.

23. The fluid control valve of claim 14, wherein the seat member defines a curvilinear surface having an arc length for engaging the lower surface of the diaphragm member, the groove extending along the curvilinear surface for substantially the entire arc length.

24. The fluid control valve of claim 14, wherein the upper surface of the diaphragm member includes a ring element circumscribing the upper surface to engage the inner surface of the valve body to bias the diaphragm in the second position.

25. The fluid control valve of claim 14, wherein the valve body further includes a first brace member and a second brace member, the first and second brace members being disposed about and engaged with the seat member.

26. The fluid control valve of claim 25, wherein the first and second brace members bisect the chamber along the first axis, and the seat member bisects the chamber along the second axis.

27. The fluid control valve of claim 25, wherein the first and second brace members are integrally formed with the seat member.

28. The fluid control valve of claim 14, wherein the valve body includes an input opening and a fluid drain opening disposed about the seat member, the input opening being in communication with the outlet and the fluid opening being in communication with the inlet.

29. The fluid control valve of any one of claims 1 or 14, wherein the groove forms a semi-circular arc in a plane perpendicular to the direction of elongation of the groove.

30. The fluid control valve of any one of claims 1 or 14, wherein the depth of the groove varies along its length such that the groove is deepest at its center and more shallow toward its lateral ends.

31. The fluid control valve of any one of claims 1 or 14, wherein the groove further bisects the engagement surface of the seat member evenly along the seat member length.

32. The fluid control valve of any one of claims 1 or 14, wherein the groove tapers narrowly at its ends.

33. A fluid control valve for providing fluid control between a first fluid and a second fluid comprising:
a body having an inlet, an outlet, and inner surface defining a passageway between the inlet and the outlet, the body further including a port in communication with the passageway and located between the inlet and the outlet; and
a flexible member engaged with the inner surface to dissect the passageway to define an inlet chamber in communication with the inlet for housing the first fluid, an outlet chamber in communication with the outlet for housing the second fluid and an intermediate chamber disposed between the inlet chamber and the outlet chamber and in communication with the port;
wherein the port includes a first portion defining a first width and a second portion axially aligned with the first portion and defining a second width, wherein further the first width is greater than the second width.

34. The valve of claim 33, further comprising a diaphragm chamber adjacent the inlet and outlet chambers.

35. The valve of claim 33, wherein the flexible member has an upper surface in communication with the diaphragm chamber and defining an upper surface area, the flexible member having a lower surface including a first lower surface portion in communication with the inlet chamber and a second lower surface portion in communication with the outlet chamber, wherein further each of the first and second lower surface portions define a surface area about equivalent to one half of the upper surface area.

36. The valve of claim 35, wherein the ratio of the surface area defined by the first and second lower surface portions to the upper surface area is about 1:1.

37. The valve of claim 36, wherein the ratio of the surface area defined by the first and second lower surface portion to the upper surface area is 1.2:1.

38. A method of pressurizing a chamber in a fluid control valve having a diaphragm member, the method comprising:
seating the diaphragm to form a gas chamber axially spaced from a liquid supply chamber;
forming a gas seat between the gas and liquid chamber;
wherein forming the gas seat includes exposing the gas seat to atmospheric pressure.

39. A method of pressurizing a chamber in a fluid control valve having a diaphragm member, the method comprising:
seating the diaphragm to form a gas chamber axially spaced from a liquid supply chamber;
forming a gas seat between the gas and liquid chamber;
wherein seating the diaphragm comprises:
applying a fluid pressure on a portion of an upper surface of the diaphragm;
applying a liquid pressure on a first lower surface portion of the diaphragm within the liquid chamber;
applying a gas pressure on a second lower surface portion of the diaphragm within the gas chamber;
the ratio of the fluid pressure to the liquid pressure being about 1 psi. of fluid pressure to about 1.2 psi. of liquid pressure.

40. The system for fire protection comprising:
a primary fluid;
a secondary fluid;
a normally closed piping network of sprinklers; and
a fluid control valve including
a valve body having a first inner surface defining a chamber having a first axis and a second axis substantially perpendicular to the first axis, the chamber including an inlet and an outlet in communication with the chamber and substantially aligned along the first axis, the inner surface including an elongated seat member substantially aligned along the second axis, the seat member defining a groove, a portion of the body further defining a port in communication with the groove; and
a flexible member engaged with the inner surface to dissect the passageway to define an inlet chamber in communication with the inlet for housing the primary fluid at a first pressure, an outlet chamber in communication with the network of pipes so as to form a normally closed system to house the second fluid at a second pressure, the second pressure being substantially constant between the outlet chamber and the network of pipes and greater than atmospheric pressure, wherein the flexible member engages the seat member to define an intermediate chamber in communication with the port;
wherein the valve body includes an input opening and a fluid drain opening disposed about the seat member, the input opening being in communication with the outlet and the fluid drain opening being in communication with the inlet.

41. The system of claim 40, wherein the flexible member comprises elongated members that engage with the inner surface further defines an intermediate chamber between the inlet and outlet chamber.

42. The system of claim 41, wherein the intermediate chamber is at least one of open to atmosphere and in communication with an alarm port.

43. The system of claim 40, wherein the flexible member further dissects the passageway to define a diaphragm chamber adjacent the inlet and the outlet chambers.

44. The system of claim 43, wherein a portion of the primary fluid is directed into the diaphragm to define an equalizing pressure to hold the flexible member into sealed engagement with the inner surface.

45. The diaphragm of claim 44, wherein the equalizing pressure and the first pressure define a ratio of about 1:1.2.

46. The system of claim 44, further comprising a release valve in communication with the diaphragm chamber to the release valve equaling pressure and release the flexible member from engagement with the inner surface so that the primary fluid is in communication with the network of sprinklers, the release valve being at least one of single interlock and double interlock.

47. The system of claim 46, wherein the release valve is an electrically actuated solenoid valve.

48. The system of claim 46, wherein the release valve is a pneumatically actuated valve.

49. The system of claim 46, wherein the release valve is a hydraulically actuated valve.

50. The system of claim 46, further comprising at least one detector to signal actuation of the release valve.

51. The system of claim 50, wherein the detector is one of a heat detector and a pressure loss detector.

52. The system of claim 40, wherein the second pressure ranges from about 8 psi. to about 12 psi.

53. The system of claim 52, wherein second pressure is about 10 psi.

* * * * *

UNITED STATES PATENT AND TRADEMARK OFFICE
CERTIFICATE OF CORRECTION

PATENT NO.        : 8,616,234 B2                                  Page 1 of 1
APPLICATION NO.   : 12/444370
DATED             : December 31, 2013
INVENTOR(S)       : Ringer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Twenty-second Day of September, 2015

Michelle K. Lee
*Director of the United States Patent and Trademark Office*